(12) United States Patent
Stone et al.

(10) Patent No.: US 7,392,992 B2
(45) Date of Patent: Jul. 1, 2008

(54) CONTAINER APPARATUS AND RELATED SYSTEMS AND METHODS

(75) Inventors: Barry Joseph Stone, Georgetown (CA); Michael Bruce Davidson, Toronto (CA); Richard Robert Coulson, Toronto (CA)

(73) Assignee: In-Store Products, Ltd. (CA)

( * ) Notice: Subject to any disclaimer, the term of this patent is extended or adjusted under 35 U.S.C. 154(b) by 0 days.

(21) Appl. No.: 10/851,447

(22) Filed: May 21, 2004

(65) Prior Publication Data

US 2005/0258610 A1    Nov. 24, 2005

(51) Int. Cl.
    *B62D 39/00*    (2006.01)
(52) U.S. Cl. .............................. 280/33.992; 280/DIG. 4; 403/322.1; 403/388; 224/411
(58) Field of Classification Search ............ 280/33.991, 280/47.34, 37, DIG. 4; 403/321, 322.1, 325, 403/323, 326, 330, 289, 385, 397, 384, 386, 403/388, DIG. 4; 224/279, 411, 400; 206/509
See application file for complete search history.

(56) References Cited

U.S. PATENT DOCUMENTS

| | | | |
|---|---|---|---|
| 221,109 A * | 10/1879 | Seiler ........................ 403/388 |
| 2,615,726 A * | 10/1952 | Brottman ................. 280/47.35 |
| 5,203,578 A | 4/1993 | Davidson et al. |
| 5,427,394 A | 6/1995 | Lauto |
| 5,435,582 A | 7/1995 | Davidson |
| 5,531,366 A | 7/1996 | Strom |
| 5,649,718 A | 7/1997 | Groglio |
| 5,797,617 A * | 8/1998 | Lin ............................ 280/655 |
| 5,845,915 A | 12/1998 | Wilson |
| 5,918,798 A | 7/1999 | Frahm |
| 6,024,527 A | 2/2000 | Soriano |
| 6,042,128 A | 3/2000 | Dinkins |
| 6,045,150 A | 4/2000 | Al-Toukhi |
| 6,328,329 B1 | 12/2001 | Smith |
| 6,431,580 B1 | 8/2002 | Kady |
| 6,607,327 B1 * | 8/2003 | Ho .......................... 403/322.1 |
| 2002/0171214 A1 | 11/2002 | Prather |
| 2003/0094778 A1 | 5/2003 | Hungerbuhler |

FOREIGN PATENT DOCUMENTS

| | | |
|---|---|---|
| CA | 2410750 | 5/2003 |
| DE | 10064156 | 7/2002 |
| FR | 2562019 | 10/1985 |
| FR | 2569151 | 2/1986 |
| WO | PCT/US99/29340 | 12/1999 |

OTHER PUBLICATIONS

"Stanley Metal Rolling Storage System with 23" Toolbox" Website http://eggshop.net/stanmetrolst.html.

* cited by examiner

*Primary Examiner*—Christopher Ellis
*Assistant Examiner*—John D Walters
(74) *Attorney, Agent, or Firm*—Bachman & LaPointe, P.C.

(57) ABSTRACT

A system can include a rigid or semi-rigid container, a caddy and a cart. A connector can be provided which is operable to provide for a first connection between the cart and the container and a second connection between the container and the caddy. At least one of the first connection and the second connection is a releasable connection. The container is also releasably attachable to said cart. Also provided is a method of using the components of the system. The system and method are well suited for application in shopping environments.

16 Claims, 17 Drawing Sheets

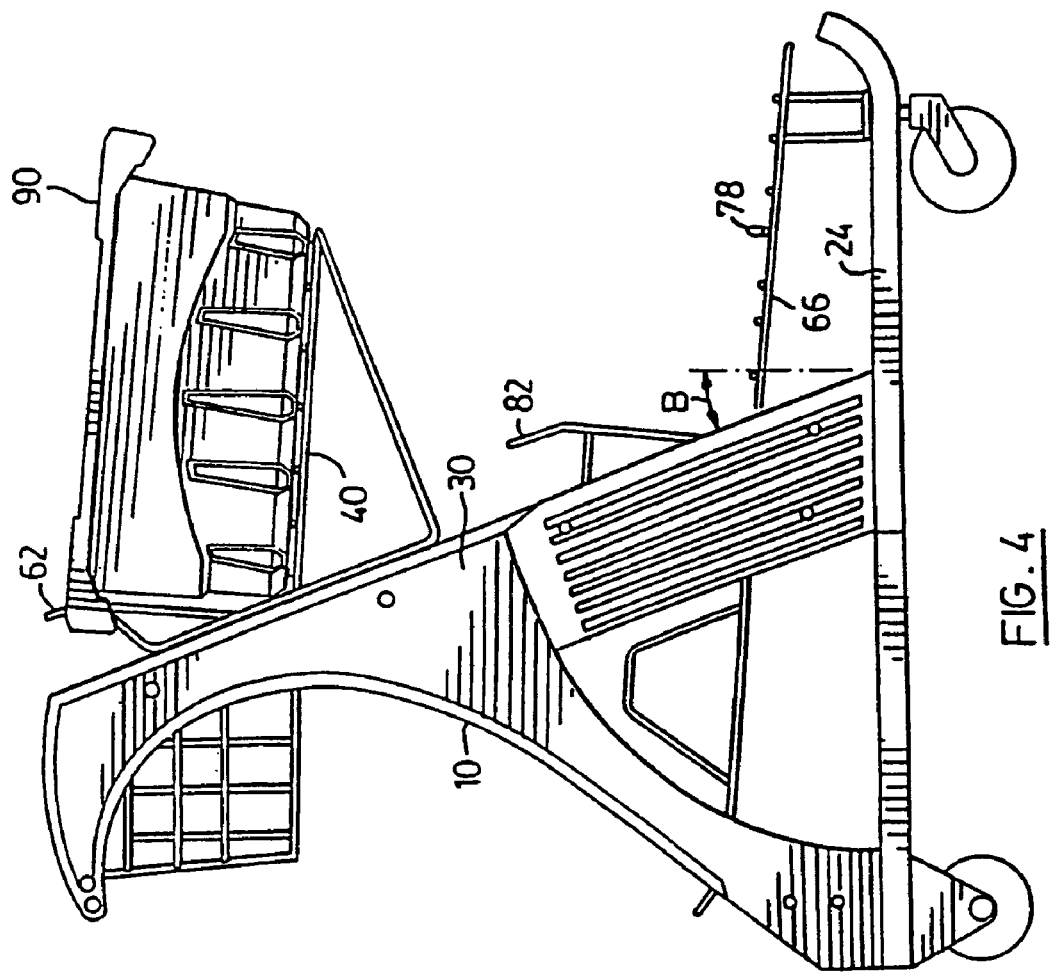
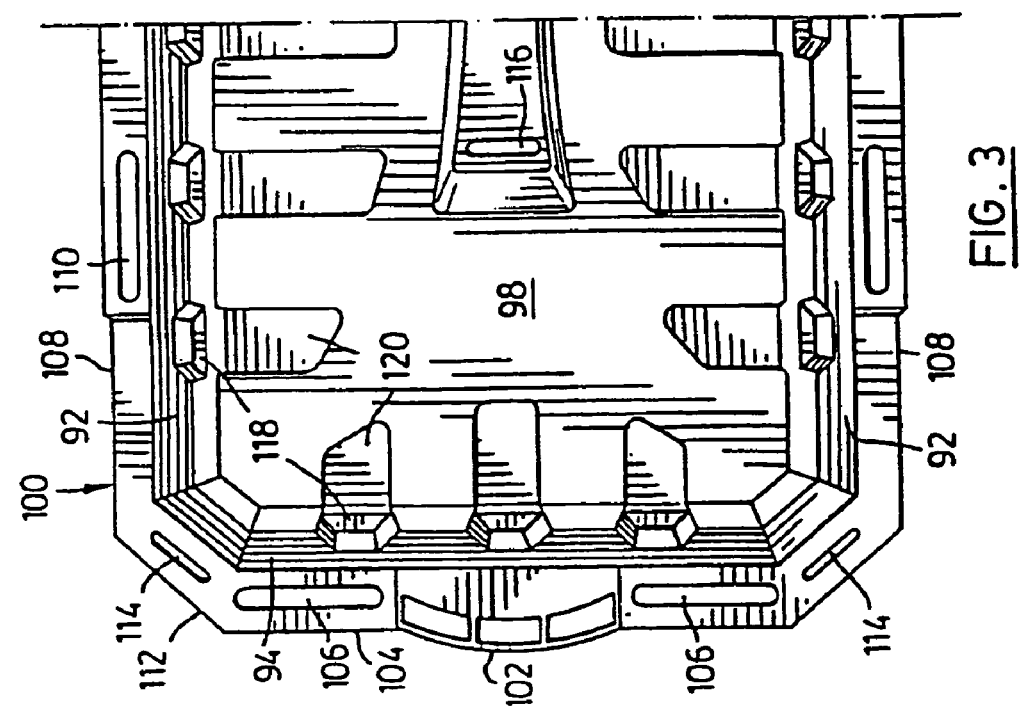

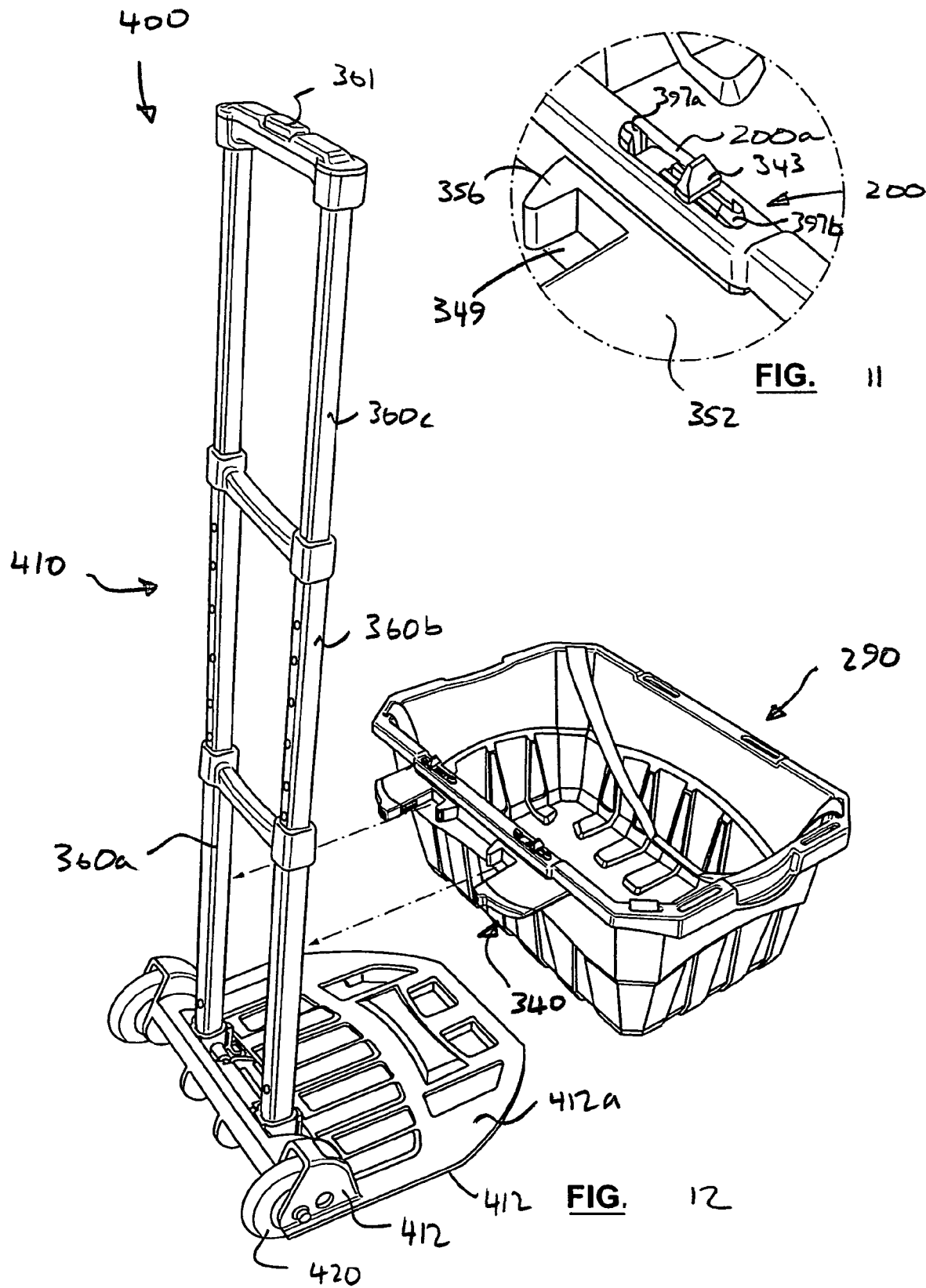

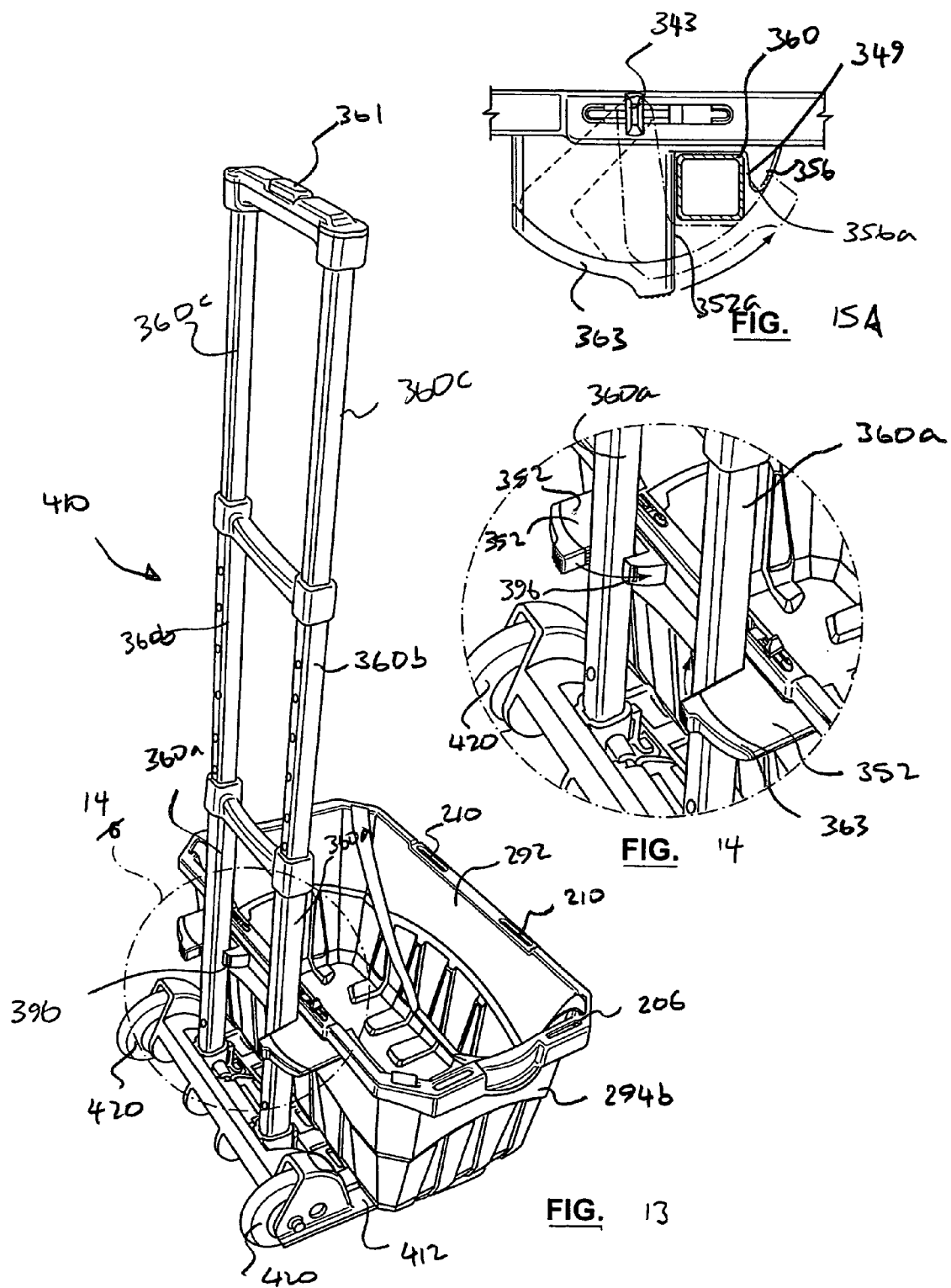

CONTAINER APPARATUS AND RELATED SYSTEMS AND METHODS

FIELD OF THE INVENTION

The present invention relates to containers and related systems and methods for transporting groceries and/or other items within, to and from a location having a plurality of items therein.

BACKGROUND OF THE INVENTION

Traditionally, customers have used shopping carts comprising a relatively deep wire basket on a wheeled frame to convey groceries or other goods from their location on self-serve shelves in a store to a check-out station. Once the customer arrives at the check-out station, the groceries are unloaded from the shopping cart by the customer onto a conveyor belt. The groceries are then typically passed over a bar code scanner or weighed by a cashier, and placed onto a receiving table. The groceries are then loaded into paper or plastic bags by the cashier, or alternatively "bagged" by the customer or a bag boy. The bags of groceries are then often placed back into the shopping cart, and the shopping cart is pushed by the customer or the bag boy to the shopper's vehicle. At the customer's vehicle, the bags of groceries are unloaded from the shopping cart and placed into the vehicle for transportation to the customer's premises where they are unloaded.

The use of a traditional shopping cart in combination with plastic or paper bags as described above entails a number of inconveniences. In the case of shopping carts having relatively deep wire baskets, occasionally softer grocery items placed near the bottom of the baskets are crushed or otherwise damaged by heavier items placed thereon. Having to unload the grocery items one-by-one from the basket onto the check-out belt is a time consuming process, and often the cashier begins ringing up the customer's order before the customer finishes his unloading task, leaving the customer no opportunity to observe the cashier. Sometimes an experienced cashier is able to organize the groceries to some extent as they are being bagged, but often the groceries are placed into bags in an unorganized fashion. Further, when the bags of groceries are loaded into or unloaded from the customer's vehicle, the bags of groceries from time to time tip over or rip, spilling their contents. And from the store's point of view, providing an endless supply of plastic or paper bags is costly and detrimental to the environment.

The present assignee is the owner of an invention related to an improved shopping cart and container system for transporting merchandise such as groceries in or about a store, and between the store and the customer's vehicle. Such cart, container and related system is disclosed in assignee's prior U.S. Pat. No. 5,203,578, the contents of which are hereby incorporated by reference herein.

The system disclosed in U.S. Pat. No. 5,203,578 comprises a plurality of containers and a shopping cart having an elongated, wheeled base. The cart has a frame extending upwardly from the base and a handle coupled to the frame for pushing the cart. The frame has at least one rack, and the rack includes shelves for supporting at least one of the containers. A securing/mounting mechanism is provided for releasably securing or mounting the containers to the shelf.

The securing/mounting mechanism can comprise at least one projection or pin extending generally upwardly from each rack and at least one aperture, preferably in a lip or rim of the container, configured to mate with the pin. The securing/mounting mechanism also preferably comprises at least one lug spaced from the pin and which extends upwardly from the shelf. An aperture or cavity is provided in the bottom of the container dimensioned to mate with the lug. The lug and cavity interaction improves the stability of the container-shelf interconnection.

The securing/mounting mechanism may comprise a pair of spaced pins and a pair of lugs spaced forwardly from the pins and extending upwardly from each rack, and a number of mating apertures in the containers. Preferably, the lip of each container is provided with a pair of spaced end wall apertures, each dimensioned to mate with one of the pins. The pair of side wall apertures can be spaced apart so as to fit over the pair of pins when the container is placed sidewise on the shelves. A pair of bottom apertures can be provided, symmetrically offset from the center of the container such that one of the bottom apertures mates with one of the lugs when a container is placed lengthwise on a shelf. This structure allows two containers to be placed lengthwise side-by-side on the shelf and be releasably secured thereto. Each container can then be secured by one of the pins and one of the lugs. Alternatively, one container may be placed sideways on the shelf and releasably secured thereto by the pair of pins.

The foregoing system is particularly useful for transporting goods around the store and then transferring the goods from the shopping cart and into an automobile.

There are, however, customers who do not have their own personal automotive transportation to transport their purchased goods home or elsewhere. Many customers travel to and from the store either on foot and may employ public transportation for at least part of the journey. For such customers the foregoing shopping container system of the present applicant has not, until now, been particularly well suited. Customers not using their own automotive transportation, will not be able to make full use of the applicant's existing container system, as disclosed in U.S. Pat. No. 5,203, 578. That system does not provide a method and system of transporting the containers, once removed from the shopping cart, other than by an automobile or the like.

Typically, customers will have to use traditional methods to transport their goods home, often using the flimsy paper or plastic bags provided by the store, and/or using some additional type of carrier device such as a separate canvas bag or knapsack. Some customers use wheeled, wire meshed caddy devices with some kind of retaining mechanism for holding the paper or plastic bags provided by the store. But there are significant drawbacks to those methods and systems.

SUMMARY OF THE INVENTION

It has been recognized that the system disclosed in U.S. Pat. No. 5,203,578 can be significantly improved if the system disclosed, could be adapted for use with a portable carrier device, such as a wheeled caddy, for readily transporting the containers, when the containers are detached from the carts and located outside the vicinity of the store.

Accordingly, there is provided according to one aspect of the invention, a system comprising shopping cart; a portable transportation device; and a container adapted for releasable connection to both said shopping cart and said portable transportation device.

According to an aspect of the invention, there is provided a method of using a system, said system comprising: a shopping cart; a portable transportation device; and a container adapted for releasable connection to both said shopping cart and said portable transportation device, said method comprising: attending at a location of a store at which said cart is located; releasably attaching said container to said cart; placing at least one item in said container; detaching said container from said cart; releasably attaching said container to said portable transportation device; and moving said container with said one item away from said location of said store with said portable transportation device.

According to another aspect of the invention, there is provided a combination of: a rigid or semi-rigid container; a caddy; a cart; and a connector operable to provide for a first connection between said cart and said container and a second connection between said container and said caddy; at least one of said first connection and said second connection being a releasable connection; said container also being releasably attachable to said cart.

According to another aspect of the invention, there is provided a connector device for use in connecting a container having an aperture, to a portable transportation device, said connector comprising a protrusion adapted for releasable locking engagement with said aperture of said container.

According to another aspect of the invention, there is provided a system comprising: a shopping cart; a portable transportation device comprising at least one wheel; a container; means for releasably connecting said container to both said shopping cart and said portable transportation device.

According to another aspect of the invention, there is provided a system comprising: a shopping cart; a portable transportation device; a rigid or semi-rigid container; means for releasably connecting said container to both said shopping cart and said portable transportation device.

According to yet another aspect of the invention, there is provided a method of using a system, said system comprising: a shopping cart; a portable transportation device; and a rigid or semi-rigid container adapted for releasable connection to both said shopping cart and said portable transportation device, said method comprising: releasably attaching said container to said cart; placing at least one item in said container; detaching said container from said cart; and releasably attaching said container to said portable transportation device.

According to yet another aspect of the invention, there is provided a system comprising: a shopping cart; a transportation device having a container connection mechanism attached thereto; and a container having a connector mechanism to provide for releasable connection to both said shopping cart and said container connection mechanism in said transportation device.

According to yet another aspect of the invention, there is provided a method of using a system, said system comprising: a shopping cart; a transportation device having a container connector; and a container having a connector device that is adapted for releasable connection to both said shopping cart and said container connector in said transportation device; said method comprising: attending at a location of a store at which said cart is located; releasably attaching said container to said cart with said connector device; placing at least one item in said container; detaching said container from said cart by releasing said connector device from said container connector; releasably attaching said container to said transportation device with said connector device; and moving said container with said one item away from said location of said store with said transportation device.

BRIEF DESCRIPTION OF THE DRAWINGS

In drawings which illustrate by way of example only, preferred embodiments of the present invention:

FIG. 3 is a half, top plan view of the container shown in FIG. 2;

FIG. 4 is a side elevation view of the container of FIG. 3 mounted on the shopping cart of FIG. 1;

FIG. 11 is an enlarged view at 11 in FIG. 10;

FIG. 12 is a perspective view of a container caddy with a container of FIG. 10 detached therefrom;

FIG. 13 is a perspective view of the container caddy of FIG. 12 with the container of FIG. 10 mounted thereto;

FIG. 14 is an enlarged view at 14 in FIG. 13;

FIG. 15A is a plan view illustrating the operation of part of the connector device of FIGS. 13, 14 and 15;

FIG. 18 is a perspective view of the container caddy of FIGS. 16 and 17 in isolation in an operational configuration.

DESCRIPTION OF THE PREFERRED EMBODIMENTS

Figure 1:
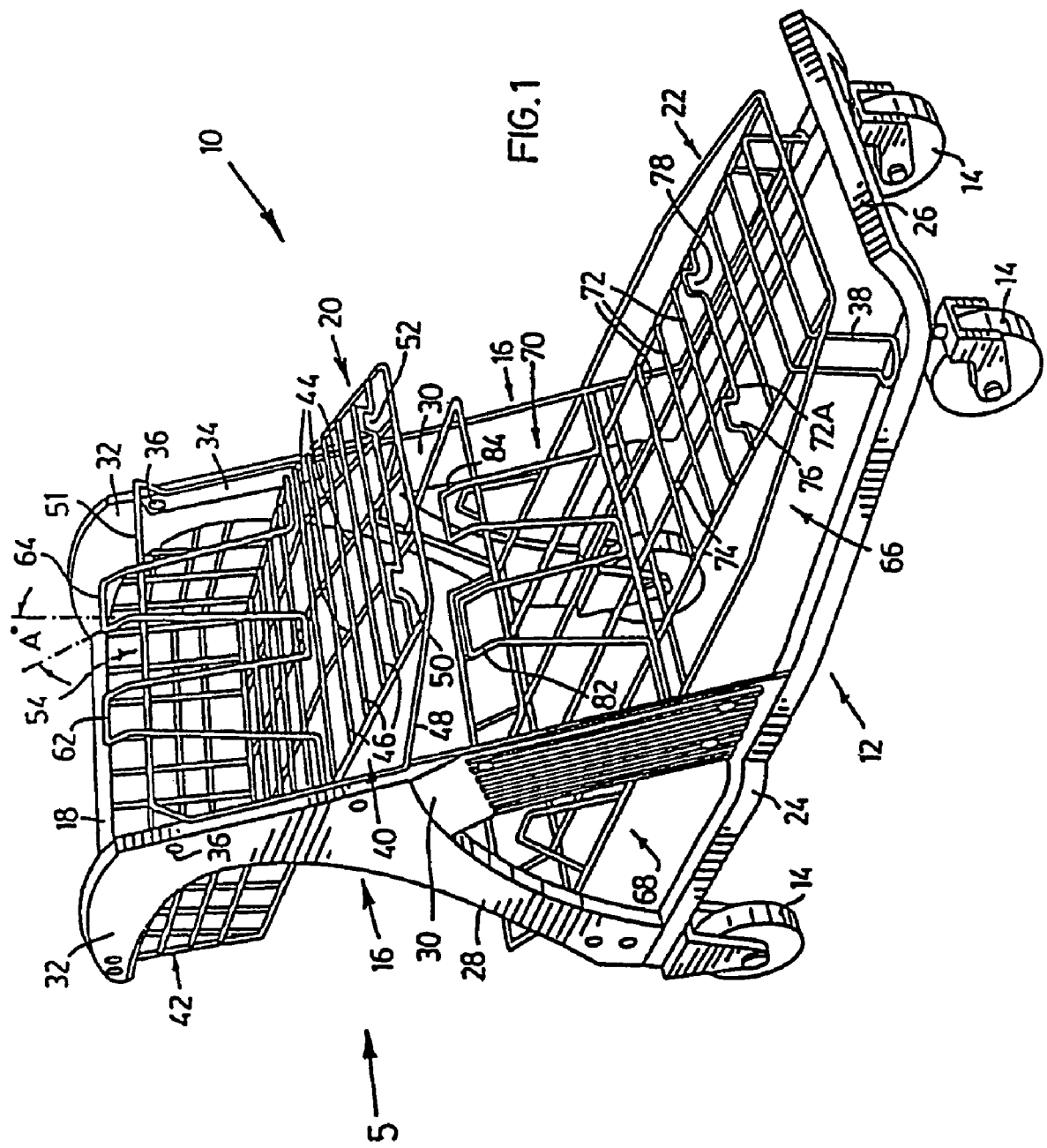
FIG. 1 is a perspective view of a preferred embodiment of a shopping cart.

Referring first to FIG. 1, a shopping cart 10 is shown and has a base 12 with standard cart wheel assemblies 14 mounted at each corner thereof. The cart also has a pair of side frames 16 and a handle 18 extending between side frames 16 at the top rear portion thereof. The cart also has an upper wire rack 20 and a lower wire rack 22.

Base 12 comprises longitudinal base members 24 coupled together at their front by a transverse base member 26. Side frames 16 preferably take the form of an upside-down lower case "y" having a shorter frame member 28 extending angularly upwardly and forwardly from the rear of longitudinal base member 24 and a longer frame member 30 extending angularly upwardly and rearwardly from about the middle of longitudinal base member 24. Longer frame members 30 each include a backwardly curved top portion 32, coupled together by handle 18 at the rear thereof. Base 12 is preferably constructed of one inch square tubing, and side frames 16 are preferably made of structural foam or molded plastic, although other types of materials may be used.

Upper rack 20 is coupled to side frames 16 by means of side mounting brackets 34 and nuts and bolts 36. Lower rack 22 is coupled to side frames 16 by means of suitable brackets and fasteners. The front of lower rack 22 includes feet portions 38, which rest on longitudinal base members 24. Racks 20, 22 are preferably made from a lattice-work of heavy gauge wire.

Upper rack 20 has an upper container shelf 40 extending forwardly from frame members 30 in a generally horizontal slightly downwardly inclined plane, and a rear babyseat 42 which may be used to carry a young child or individual grocery items. Container shelf 40 comprises a matrix or lattice-work of intersecting longitudinal extending wires 44 and transverse wires 46. Container shelf 40 is supported by angular support arms 48 attached to frame members 30. A forward one of transverse wires 46 includes a pair of upwardly extending locking lugs 50, 52. Upper rack 20 also comprises a partition 54 which separates babyseat 42 from upper container shelf 40. Partition 54 comprises transverse bar 51 extending between side frame members 30 and a pair of generally vertical locking projections or pins 62, 64, which are preferably formed from inverted U-shaped loops of wire extending upwardly from the floor of container shelf 40. Locking pins 62, 64 are preferably slanted backwardly at an angle A of about 5 degrees to the vertical.

Lower rack 22 comprises a lower container shelf 66 extending forwardly from frame members 30 in a generally horizontal, slightly downwardly inclined plane, and a rear bulk food item basket 68, separated from lower container shelf 66 by partition 70. Lower container shelf 66 is similar to upper container shelf 40, in that it is made of a lattice-work of transversely extending wires 72 and intersecting longitudinally extending wires 74. Transverse wire 72A comprises locking lugs 76, 78, which preferably take the form of upwardly extending looped portions of wire 72A. Partition 70 is similar to partition 54, and includes a transverse bar extending between frame members 30 and a pair spaced generally vertical locking pins 82, 84, which are preferably bent backwards at an angle of about 5 degrees to the vertical.

Figure 2:
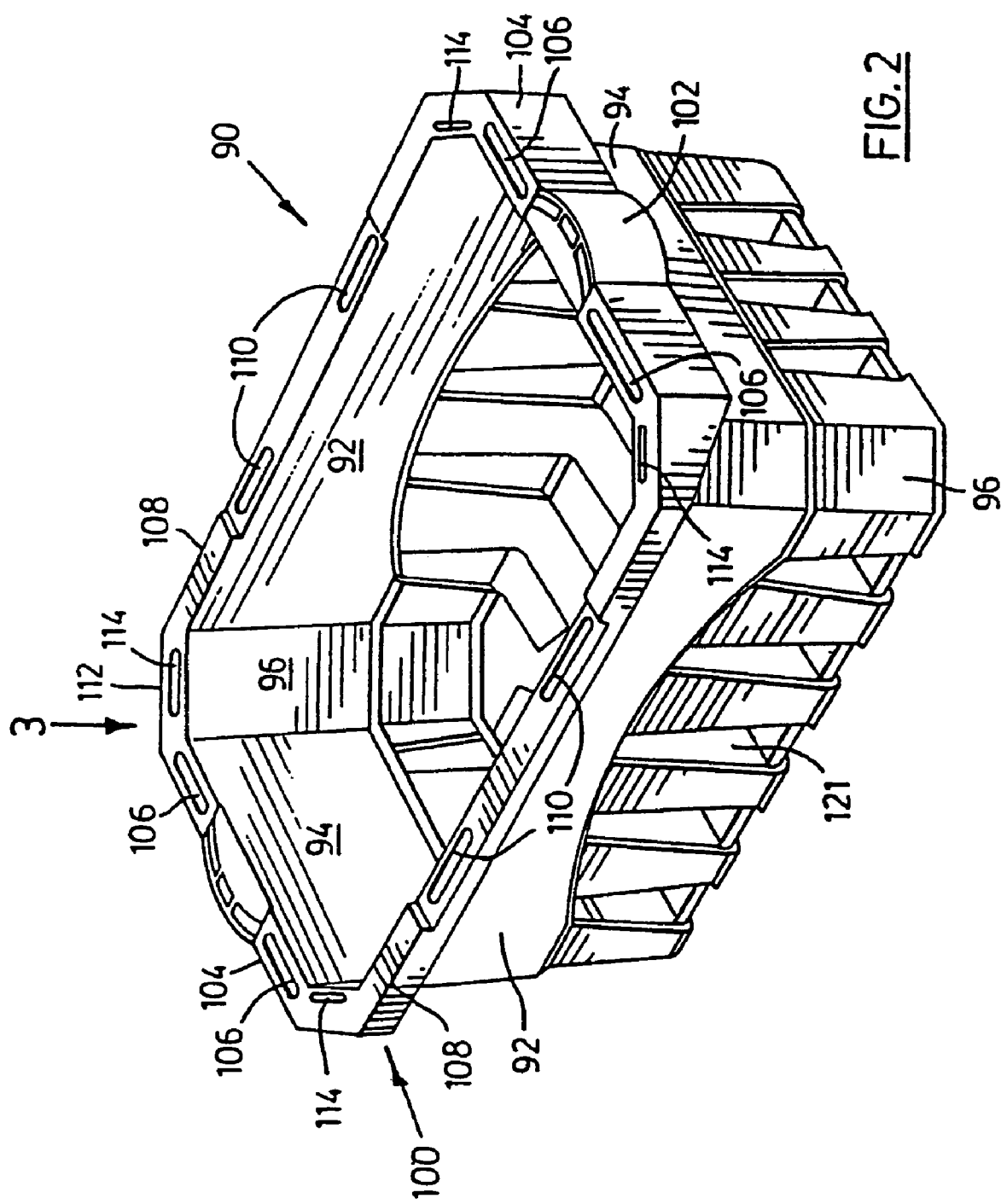
FIG. 2 is a perspective view of one embodiment of a container, that can be part of the present invention.

Referring now to FIGS. 2 and 3, the shopping cart and container apparatus of the present invention also comprises a plurality of merchandise containers 90, having a pair of opposed side walls 92, and a pair of opposed end walls 94 joined together to side walls 92 at angled corners 96. Side walls 92 and end walls 94 extend generally upwardly and outwardly from bottom 98. Circumferential rim or lip 100 extends laterally outwardly from the top of side walls 92 and end walls 94. Containers 90 are preferably rectangular, having a width defined by the length of end walls 94 and a length defined by the length of side walls 92. Containers 90 are preferably constructed of high impact plastic or the like.

Lip 100 comprises lip end portions 104 extending laterally outwardly from the tops of end walls 94. Lip end portions 104 each include a handle portion 102 having a conformed bottom gripping surface, and a pair of end apertures 106 centered around handle portion 102. Apertures 106 are spaced apart and dimensioned so as to mate with locking pins 62, 64 on upper shelf 40 or locking pins 82, 84 on lower shelf 66. The distance between end apertures 106 is preferably selected to be equal to the distance between locking pins 62, 64 or locking pins 82, 84, to enable a pair of end apertures 106 to mate with a pair of locking pins.

Container lip 100 also comprises lip side portions 108, extending laterally outwardly from the tops of side walls 92. Lip side portions 108 each have a pair of side apertures 110, which are spaced apart and dimensioned to receive locking pins 62, 64 or locking pins 82, 84, when container 90 is placed sideways on upper shelf 40 or lower shelf 66.

Container lip 100 also comprises corner portions 112 extending laterally outwardly from the tops of corner portions 96, which have corner apertures 114 for receiving a handle strap (not shown in this embodiment).

Provided in bottom 98 of container 90 are a pair of bottom apertures 116 symmetrically spaced from the midpoint of the container to receive one of locking lugs 50, 52 when container 90 is mounted lengthwise on upper shelf 40, or to receive one of locking lugs 76, 78, when containers 90 are mounted lengthwise on lower shelf 66, as discussed below.

The bottom 98 and walls 92, 94 of container 90 are strengthened by means of reinforcement means 118 and 120. In this embodiment, cut-outs 121 are provided in side walls 92 to save weight and for appearance. Side and end walls 92, 94 are slanted outwardly, to make containers 90 stackable and nestable.

Referring now to FIG. 4, there is illustrated therein a container 90 shown secured to upper shelf 40 of shopping cart 10 by the securing means of the present invention, comprising in this case locking pin 62 extending through one of end apertures 106 of container 90, and a locking lug engaging one of bottom apertures 116 of container 90. Alternatively, container 90 could be secured to lower shelf 66 by means of a securing mechanism comprising locking pin 82 and locking lug 78, and apertures 106, 116. Upper rack 40 is spaced far enough above lower rack 66 to enable container to be easily placed on and removed from lower rack 66.

The longitudinal axis of frame members 30 is slanted backwardly relative to longitudinal base members 24 at an angle B, and the length of upper shelf 40 is preferably less than the length of lower shelf 66. This construction results in upper shelf 40 being offset rearwardly from and not completely covering lower shelf 66, thus giving the shopper convenient access to lower shelf 66, for the purposes of loading grocery items into containers 90 secured on lower shelf 66, removing containers 90 from lower shelf 66, and so on.

Figure 5:
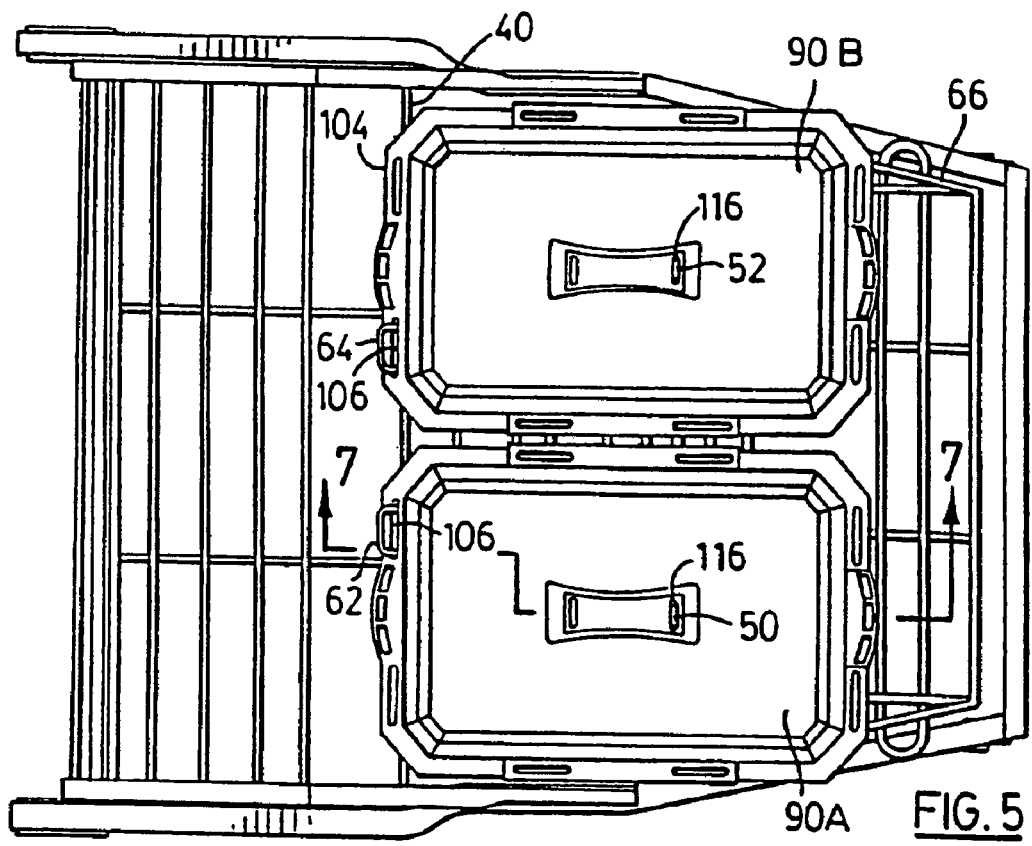
FIG. 5 is a top plan view of the shopping cart of FIG. 1, showing two containers as illustrated in FIG. 2, mounted lengthwise side-by-side on the top shelf thereof.
Figure 7:
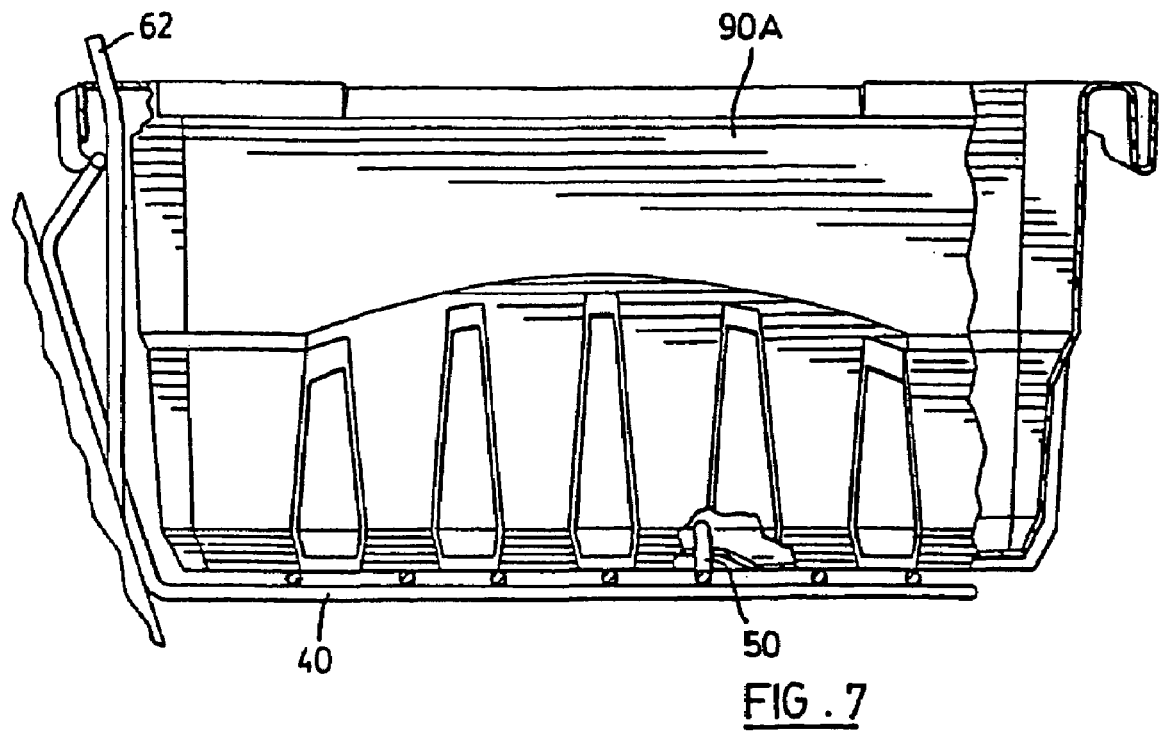
FIG. 7 is a staggered, part sectional view of the container of the present invention shown mounted on the shopping cart, taken along line 7-7 in FIG. 5.

Referring now to FIGS. 5 and 7, the width of the containers 90 is selected to be narrow enough to enable two containers to be mounted lengthwise side-by-side on either upper shelf 40 or lower shelf 66. As shown in FIG. 5, containers 90A, 90B are secured to upper shelf 40 by placing them lengthwise side-by-side such that locking pin 62 extends through the inside end aperture 106 of container 90A and locking pin 64 extends through inside end aperture 106 of container 90B, and such that locking lug 50 registers with and extends through a bottom lug aperture 116 of container 90A, and lug 52 registers with and extends through a bottom lug aperture 116 of container 90B. Two additional containers may be secured to lower shelf 66 in a similar fashion.

Further, locking lugs 50, 52 are spaced far enough apart to allow a single container 90A or 90B to be mounted lengthwise on upper shelf 40, by engaging locking pins 62, 64 with a pair of apertures 106 within end wall lip 104 of container 90A or 90B.

Figure 6:
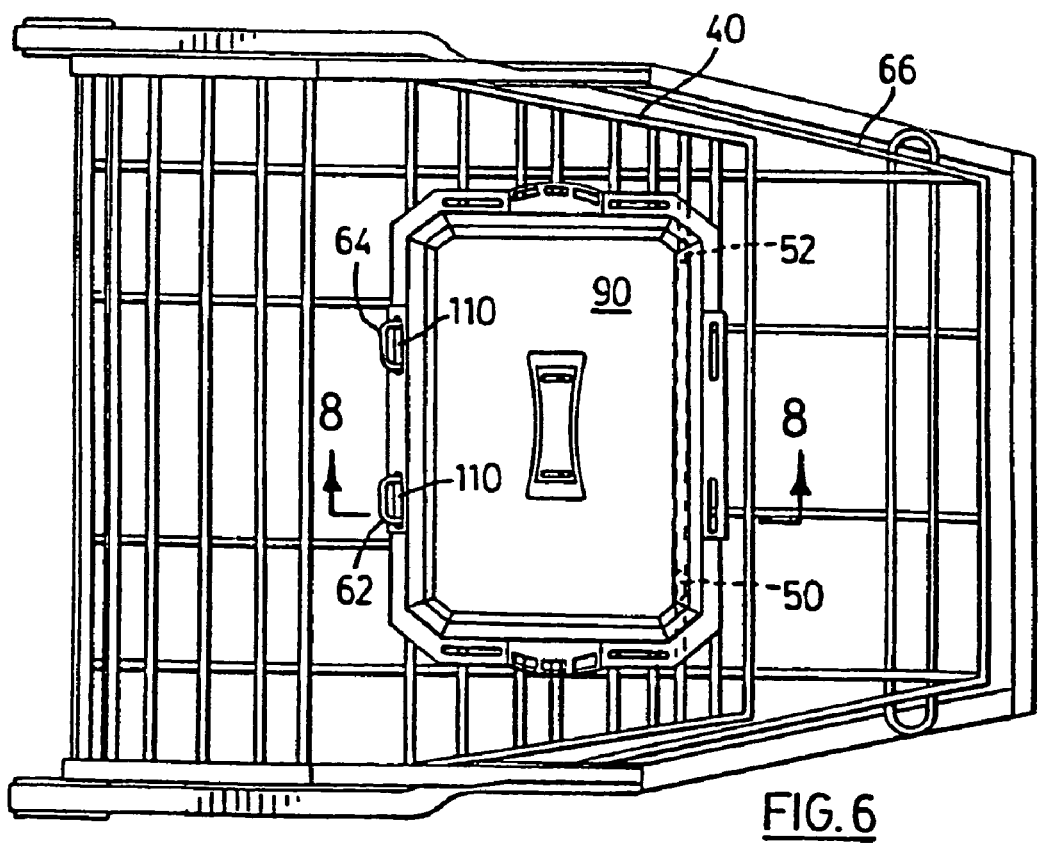
FIG. 6 is a top plan view of the shopping cart of FIG. 1, showing a single container as illustrated in FIG. 2, mounted sideways on the top shelf thereof.
Figure 8:
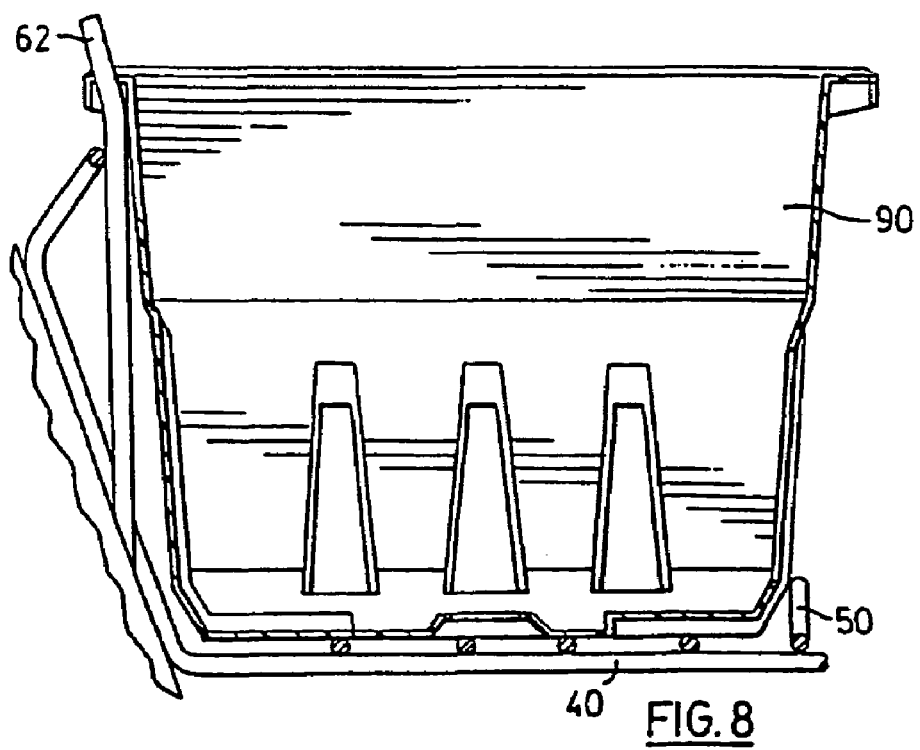
FIG. 8 is a sectional view of the container of the present invention shown mounted on the shopping cart, taken along line 8-8 in FIG. 6.

Alternatively, referring now to FIGS. 6 and 8, if a shopper wishes to mount only one container sideways on shopping cart 10, then container 90 may be secured to upper shelf 40 placing it sideways on shelf 40 in such a position that locking pins 62, 64 extend through side apertures 110 of container 90. The longitudinal distance between locking pins 62, 64 and locking lugs 50, 52 is selected to be greater than the width of container 90, such that when container 90 is mounted in the sideways or transverse position, locking lugs 50, 52 extend upwardly beyond the perimeter of container 90 and do not mate therewith.

The use of the subject shopping cart and container apparatus just described, is recited in applicant's own U.S. Pat. No. 5,203,578 but is now substantially repeated herein, at least in part for ease of reference.

Shoppers interested in shopping at a supermarket or other store utilizing the shopping cart system of the subject invention, would typically purchase or rent up to 4 or 5 of the subject containers 90. The shoppers would then borrow a shopping cart 10, typically provided for customers' use by the supermarket or other store, and secure containers 90 to the shopping cart 10, as follows. Containers 90 are loaded unto shelf 40, 66 by tipping the container at a 5 degree angle to the vertical and registering the appropriate apertures of containers 90 with the appropriate locking pins or lugs, and then lowering the container 90 so that it sits flat on the appropriate shelf 40 or 66. One or two containers may be secured lengthwise to either shelf by positioning them as shown in FIG. 5. If two containers are mounted in a side-by-side configuration, one end aperture 106 is mated with one of the locking pins 62, 64, and one of the bottom apertures 116 is mated with one of the locking lugs 50, 52. If the customer desires to use only one container, then such container can be secured to shopping cart 10 in one of several ways. The container can be secured lengthwise in the center of or to one or the other side of either the top shelf or the bottom shelf, as shown in FIG. 5. Alternatively, it can be secured sideways across top shelf 40 as shown in FIG. 6 or bottom shelf 66. In the latter "sideways" case, the box is secured by placing side apertures 110 over locking pins 62, 64, by tipping the container at the required 5 degree angle to the vertical, and then rotating the container downwardly such that it rests flatly on shelf 40. In either case, container 90 is effectively releasably secured to shelf 40 or shelf 66, by means of two points of securement between container 90 and shelf 40 or 66 of shopping cart 10.

Use of the shopping cart and container apparatus just described will assist shoppers in organizing his or her groceries by providing a plurality of containers or bins within which related grocery items may be placed. The use of a plurality of such containers, which are shallower than the deep baskets of typical shopping carts, should prevent or reduce damage to softer or more fragile grocery items, which sometimes results when a large number of grocery items are piled on top of one another. Furthermore, when the shopper reaches the check-out stand, he or she merely has to remove only a few containers, and place them on the check-out stand conveyor, rather than removing each grocery item on a one-by-one basis. This allows the shopper to monitor if desired the actions of the cashier.

To check out the merchandise being purchased by a shopper using the subject shopping cart and container apparatus, a cashier would typically place an empty container on the exit conveyor of the check-out stand, and then remove each item of merchandise from the shopper's container closest to the check-out stand, pass each item over a scanner, and then place the item into the container placed on the exit conveyor. When the first container on the entry conveyor is emptied, the now full container on the exit conveyor is removed and placed in the shopper's shopping cart, and the now empty first shopper's container is placed in its place, and the process is repeated.

However, unlike in the existing method and system, as each container of checked-out grocery items or other merchandise is filled, it may not be re-secured on the shopping cart 10 for transportation to an automobile, as described above. Rather the container that is used in the present invention can be secured to a portable transportation device such as a wheeled container caddy 400 (See FIG. 12 by way of example), as will be described in detail hereinafter.

Figure 9:
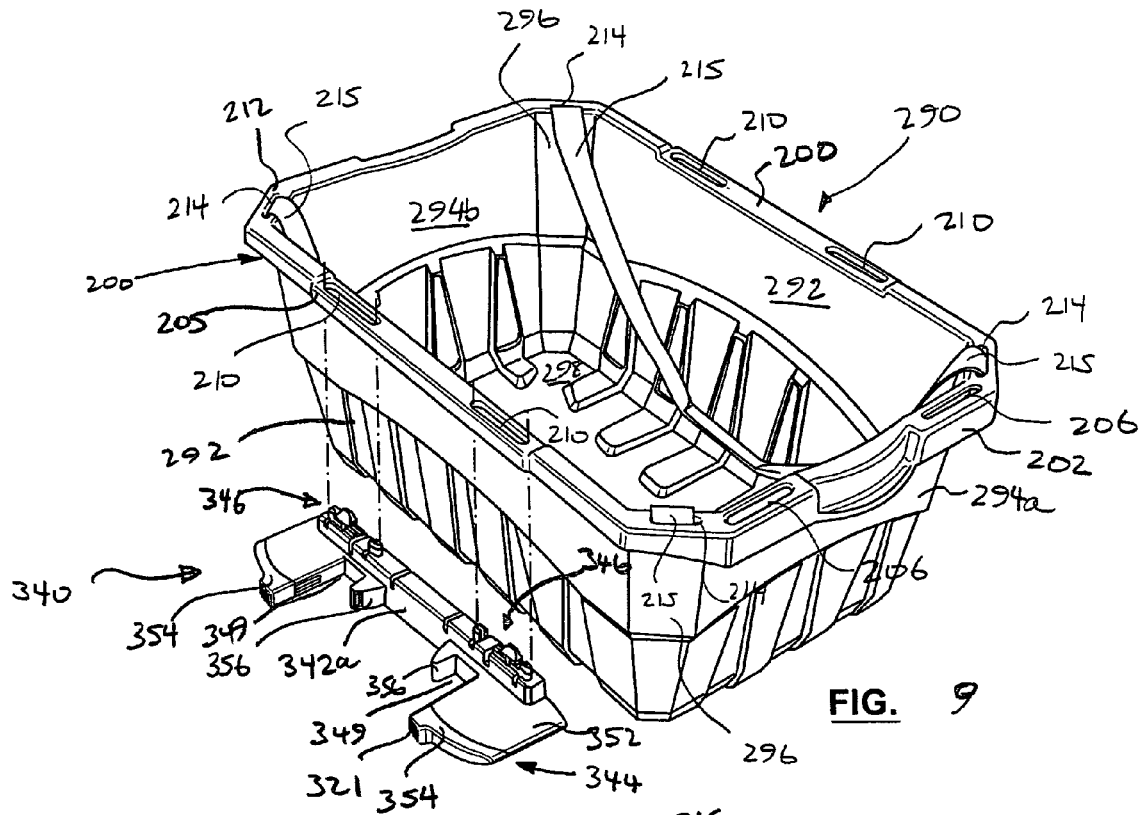
FIG. 9 is a perspective view of an alternate embodiment of a container with a connector device detached therefrom, that can be used in the present invention.
Figure 10:
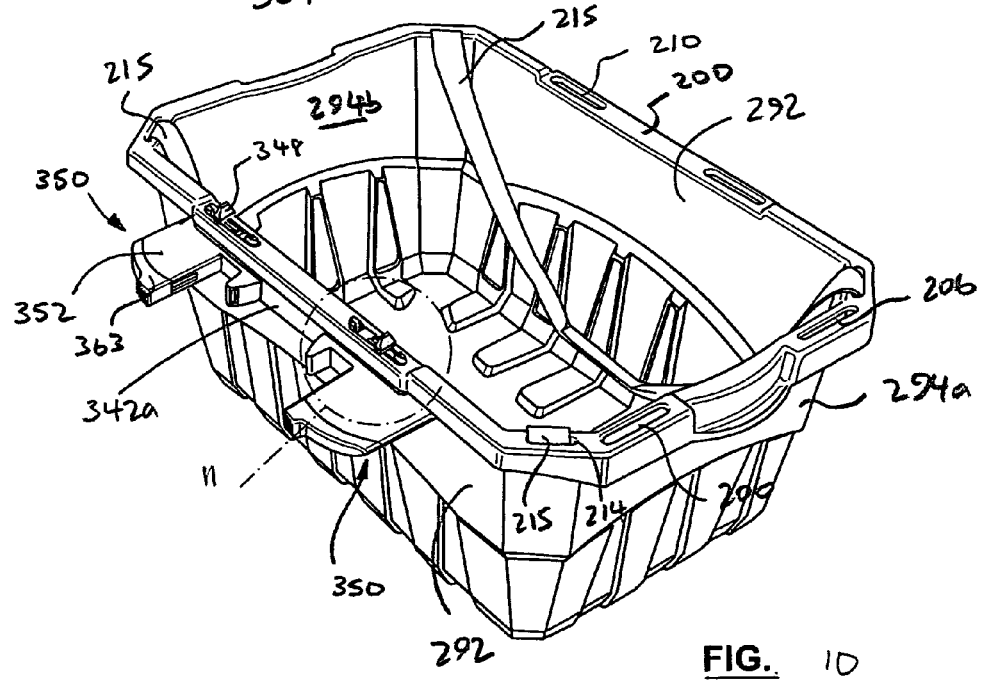
FIG. 10 is a similar view as FIG. 9 but showing the connector device mounted to the container.

With reference now to FIGS. 9 and 10, a container 290, which is similar in structure to container 90 described above, is disclosed. Like container 90, container 290 can be formed with a pair of opposed side walls 292 and a pair of opposed end walls 294 joined with the side walls 292 at angle corner walls 296. Side walls 292 and end walls 294 extend generally upward and outwardly from bottom wall 298. Circumferential lip 200 extends laterally outwards from the top edges of the side walls 292, corner walls 296 and end walls 294a, 294b. Other configurations for containers are of course possible.

Like containers 90, containers 290 can be constructed of a high impact plastic such as High Density Poly Ethylene or other similar materials. The materials can be selected such that they are relatively lightweight, but also strong and rigid to withstand the general use of the containers as described herein.

At one end wall 294a of container 290, is a flange 202 that depends downward from lip 200. The portion of lip 200 at the same end wall 294a has apertures 206 which like apertures 106 in container 90 can be configured to receive upwardly extending projections like projections 62 or 64 on shopping cart 10, as described above. Apertures 206 could also be provided on lip 200 above the opposite end wall 294b.

A flange 205 also depends downward from the outer edge of lip 200 along the side walls 292.

Container lip 200 also has corner portions 212 above corner walls 296, which have apertures 214 for receiving an end of a carrying strap 215. Straps 215 can be made of any suitable material, but may be made from a relatively strong, yet flexible or semi-flexible material like leather or canvas. Straps 215 shown in this embodiment of FIGS. 9 and 10, extend longitudinally between corner apertures 214 on a common side 292 of the container 290, but other configurations can be employed. Thus, straps 215 can be used if desired to assist in lifting the container 290. However, straps 215 are not particularly well adapted for moving containers, when loaded with goods, over relatively long distances. It should be noted that although the straps are shown inserted into the slot from above, this could possibly interfere with the attachment of the lid 310 (FIG. 16) to the container. Reversing the mounting of the strap, so that the strap does not interfere with the upper surface of the lip 200 is possible. For example, the strap could be inserted into a corner slot from underneath on the outside face of the flange, with an end portion protruding through and configured to hold the strap in place, can allow the strap to be more easily used in conjunction with the lid. Of course, other strap attachment mechanisms could be employed to provide a pair of straps running longitudinally which can be used to lift the bins 290.

Figure 16:
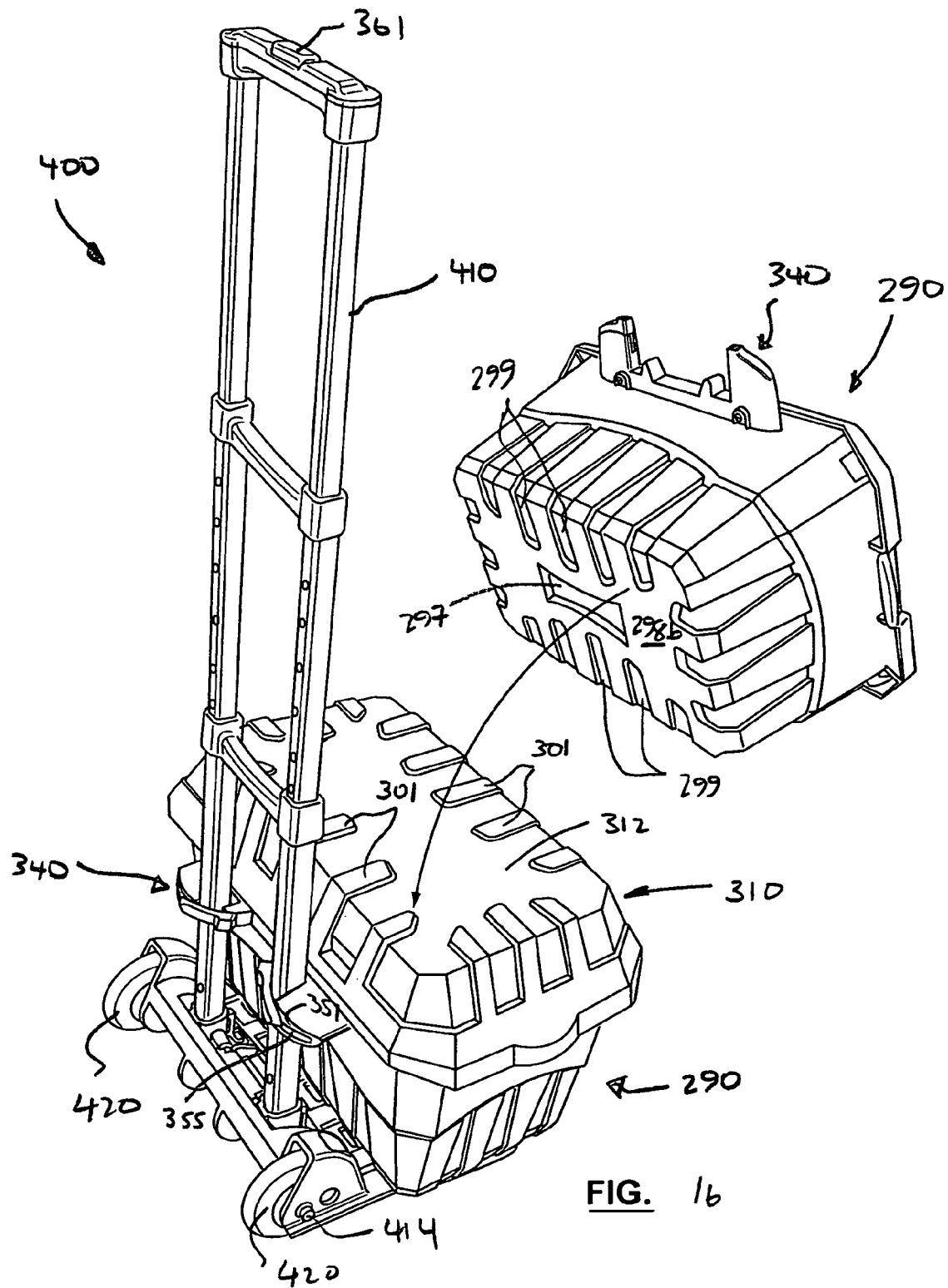
FIG. 16 is a perspective view of a container caddy and a first container connected thereto, as illustrated in FIG. 13, and showing the stacking and connection of a second container thereto with the lid of the first container separating them.
Figure 17:
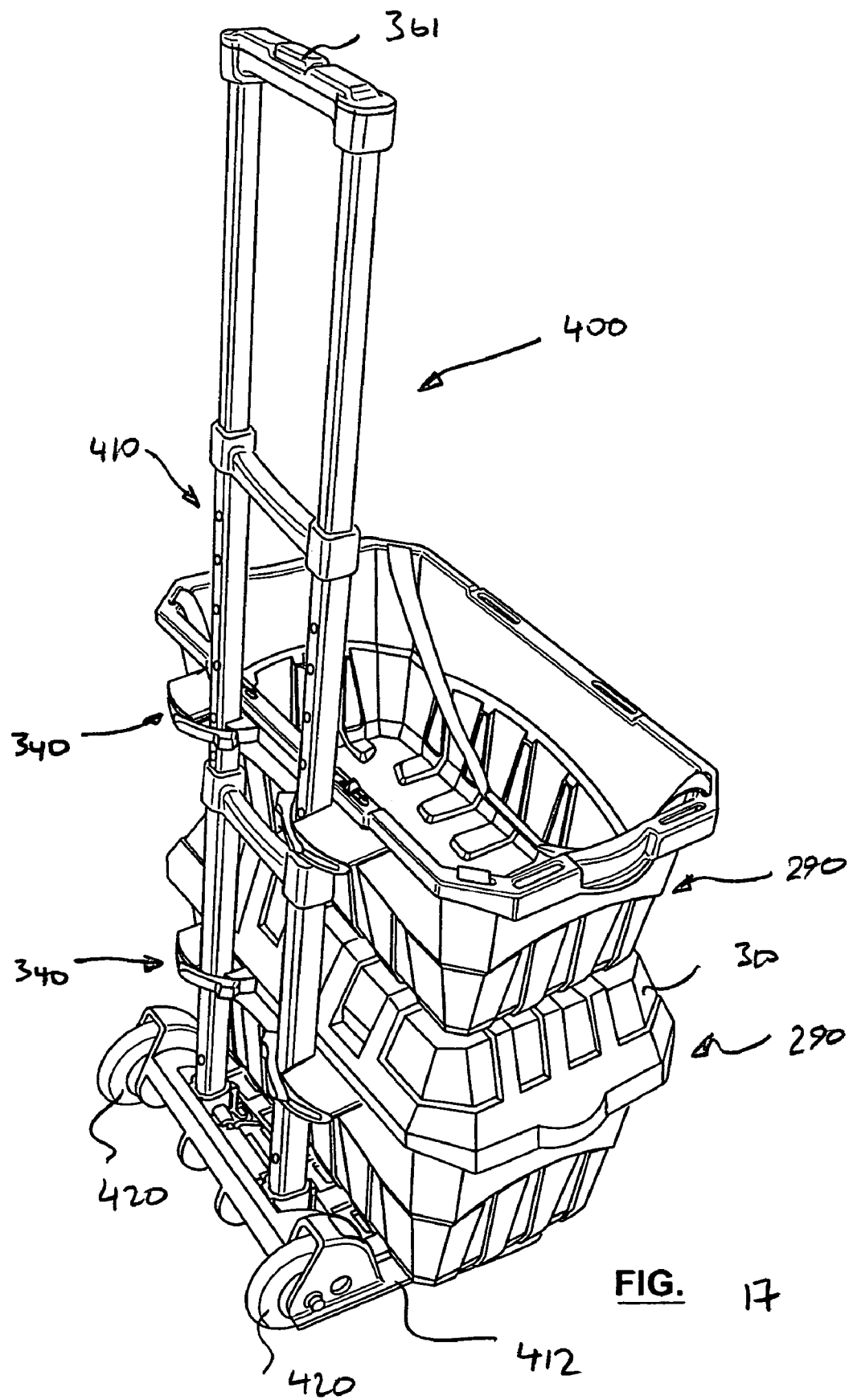
FIG. 17 is a perspective view of the container caddy and container of FIG. 16 with the second container mounted and secured thereto.

As illustrated in FIG. 16, the downwardly facing surface 298b of base 298 of container 290 can have a series of laterally and inwardly extending channels 299 having closed ends. Each container 290 is typically also provided with a lid member 310 which has an upper surface 312 that also has a series of inwardly and laterally extending protrusions 301. Protrusions 301 can be configured to be received in channels 299, while permitting upper surface 312 of lid 310 to mate with lower surface 298b, when one container 290 is stacked on top of another container sitting above, as shown in FIGS. 16 and 17. The interaction of protrusions 301 with channels 299, provides for greater stability when one container is stacked on top of another container; by perfectly aligning the engineered grooves, the stacked containers are centered, either during transportation on a caddy 400, or in a storage mode, as will be described in greater detail hereinafter.

Returning to FIGS. 9 and 10, in addition to container 290, a connector device generally designated 340 is illustrated. Connector 340 serves the function of releasably connecting the container 290 to the portable transportation device 400. In this preferred embodiment, the portable transportation device is a wheeled caddy with two wheels, but this portable transportation device could be numerous other devices. By way of example only, the device could be a caddy with more or less than one or two wheels, such as a sled. The device also could include a rack mounted bicycle or snow mobile, or the rear of a golf cart. Furthermore, the container 290 with the connector device 340 could even be used in conjunction with automotive transportation. For example, the container 290 could be provided with a connector device that permits it to be connected both to a shopping cart and to a rack or similar device mounted in for example a trunk or other part of an automotive vehicle, so that the container is more stably secured therein.

Figure 15B:
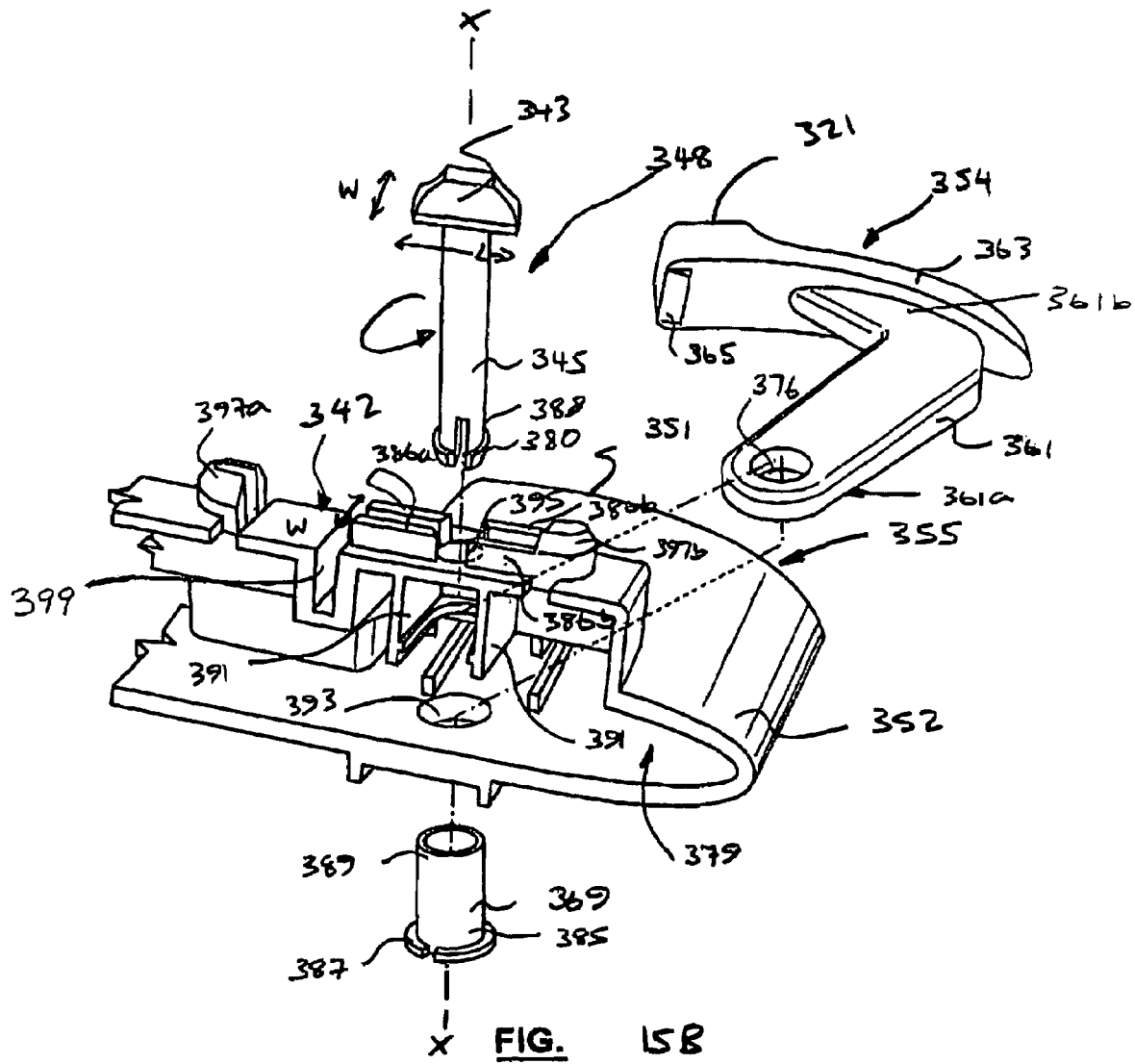
FIG. 15B is an exploded, perspective view of an end part of the connector device shown in FIG. 15A.
Figure 15C:
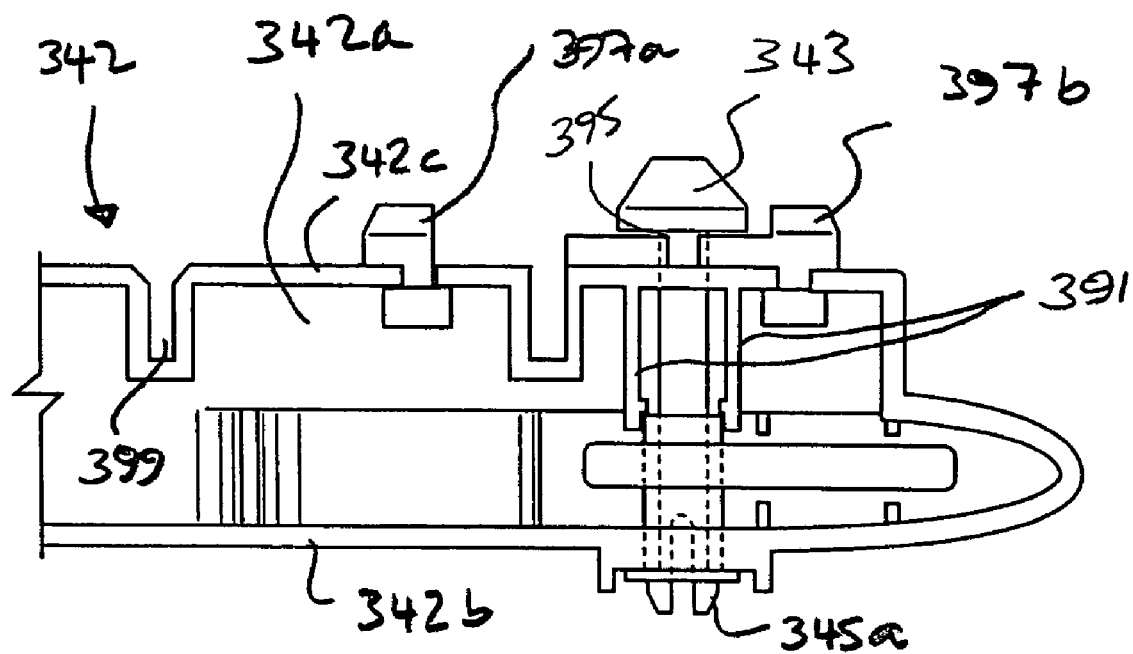
FIG. 15C is a front elevation view in section, of the part of the connector device shown in FIG. 15B.

Connector device 340 can comprise, as shown in detail in FIGS. 15B and 15C, a longitudinally extending generally C-shaped channel portion 342, which may be made from a plastic material such as High Density Poly Ethylene. Of course other suitable materials can be employed.

Channel portion 342 has a central web 342a, an upper flange 342c and a lower flange 342b. Portion 342 may also be formed in other configurations, such as by way of example only, a hollow tube that can be generally rectangular in cross section.

Connector device 340 comprises in this embodiment, two separate connector mechanisms at each end of channel member 342; specifically a caddy connector generally designated 344 and a container connector generally designated 346.

Container connector 346 can comprise, as is shown in more detail in FIGS. 11, 15A, 15B and 15C, one or more of several components, including a pair of spaced, transversely extending slots 399 which engage appropriately positioned, transversely extending ribs (not shown) that extend downward from the lower surface of lip 200 at a side wall 292. The walls of slots 399 can be integrally formed as part of channel 342.

Connector 346 also may include spaced, upstanding positioning protrusions, 397a, 397b each pair being received upwardly into an aperture 210 to engage the inward facing surfaces of aperture 210. Protrusions 397a, 397b assist in ensuring that connector 346 is appropriately positioned in relation to apertures 210 when connector device 340 is mounted to container 290.

Additionally, connector 346 can include a releasable locking mechanism which, as illustrated, can comprise a pivoting protrusion member generally designated 348 which is adapted to be received in releasable locking engagement through apertures 210 in rim 200. Each protrusion member 348 has a head portion 343 mounted or formed at the top of a rotatable stem portion 345. The stem portion 345 extends through a bore passing through an aperture 395 in an end portion of upper flange 342c and an aperture 393 in a corresponding end portion of lower flange 342b. Stem 345 is retained by and mounted for rotation about axis X-X (FIG. 15B). However, at lower flange 342b, the stem 345 passes through a bearing cylinder member 369, and rotates therein. Cylinder 369 is fixed relative to the channel member and has an upper end portion 389 that is held between spaced downwardly depending, transverse webs 391 which extend down from the upper flange 342b of channel 342. The lower portion 385 of cylinder 369 has formed at or near its lower edge, a retaining ring 387 which when assembled, is positioned below the lower surface of web 342b. The lower end of stem 345 is formed as a pair of spaced legs 388 which have a flared circumferential flange portion 380. Legs 388 may be resiliently displaced, and can be inserted through bearing cylinder 369 such that flange portion 380 will provide a releasable locking mechanism for the stem 345. Legs 388 exert a force outward to keep the stem 345 locked in bearing cylinder 369 but can be displaced inward by application of an external force, if it is desired to take apart the assembly.

In this way stem 345 and head 343 can rotate about axis X-X but can not be significantly axially displaced relative to channel member 342.

Upstanding channel walls 386a, 386b are formed with a width W and such that they can also be received into aperture 210 when connector 340 is brought into mating engagement with container 290. Likewise, protrusions 348 are configured such that their head portion has a length L and a width, which is typically also about the same width W of apertures 210. Such a configuration enables heads 343 to pass axially upward through side apertures 210 in lip 200 of container 290, when oriented in one rotational position. However, when rotated, at some point up to or at 90 degrees, length L of head portion 343 will not be able to pass axially downward back through the width of an aperture 210. The result, as shown in FIGS. 10 and 11, is that once the protrusion heads 343 are received through apertures 210, such that the heads 343 are positioned above the upper surface 200a of lip 200 surrounding apertures 210, heads 343 can be rotated to some position up to or past 90 degrees to have their longitudinal direction in a transverse orientation relative to apertures 210 that is sufficient to prevent connector device 340 from being able to form a connection and preferably not move substantially downwardly at all relative to container 290. Additionally the mounting of stem 345 can be such that there is some degree of frictional resistance against rotational movement. Thus once the stem has been rotated to a particular rotational position, it will not easily rotate without the application of a significant external force. Additionally, if desired, the heads 343, and walls 386a, 386b can be configured so that when rotated 90 degrees, protrusions 348, force lip 200 to be compressed to some small degree between the head 343 of protrusion 348 and surface of walls 386a, 386b, to provide for a stiff and tight connection of connector device 340 to container 290.

It will however be appreciated that the container connector mechanism 346 described above, is only one of numerous other types of container connectors that could be employed. Various other types of releasable connection mechanisms could be provided such, as by way of example only a spring loaded hook that extends through the hole and which can be configured to pivot so as to be able to catch the rim of the container. One of the many other possible alternatives is that the container itself could be configured to provide for an aperture in an extension or recess area, that might be integrally formed with the rest of the container. The extension portion of the handle could then fit and extended directly into and through the aperture and thus be directly connected to the container, thus obviating the need for a separate connector device. A plurality of like containers could possibly be stacked together and the handle passed through a series of like apertures in each of the containers.

Additionally, in some embodiments, connector 340 could be configured so that the connector 340 is permanently affixed to or is integrally formed as part of container 290 (so long as connector 340 has a caddy connector 344 that is releasable).

In addition to container connector 346, the connector device 340 has at each end of channel member 342, caddy connectors generally designated 344 which are for attaching the connector device 340, and thus container 290, to a container caddy 400. In the preferred embodiment caddy connectors 344 are configured as releasable clamp mechanisms 350 having a main housing 352 which can also be integrally formed with channel member 342. Housing 352 can be partially open and formed with an inner cavity 379. Housings 352 have a longitudinally extending slot 355 at a wall face 351. As shown in FIG. 15B, a latch arm generally designated 354 includes a pivot arm 361, which is mounted for pivoting rotation through its own integrally formed aperture 376 positioned toward end 361a, about the fixed bearing cylinder member 369.

Latch arm 354 also includes a latch plate 363 fixedly mounted at end 361b of pivot arm 361. Latch arm 354 is configured so that end portion 361b of pivot arm 361 passes through and can move longitudinally within slot 355 of housing 352. Latch plate 363, in this embodiment, is configured to cover slot 355, when the latch arm 354 is in an open position.

Latch plate 363 has at an outer surface a friction enhancing feature, such as a serrated uneven, or roughened surface, to assist a user in moving the plate 363 into a locking engagement position as described below.

Spaced from housing 352 is another extension portion 356, which extends inwardly from the outside surface of web portion 342a of channel 342. Extension portion 356 has an inner slot surface 356a spaced from inner slot surface 352a of housing 352, to provide a slot 349 therebetween.

As best shown in FIG. 15A, latch arm 354 pivots between a retracted position shown in solid line, about its pivot location and such that a leading end portion of plate 363 will contact extension portion 356. To provide for a releasable locking engagement between plate 363 and extension portion 356, plate 363 has a raised detent protrusion 365 on an inward facing surface which can engage slots 396 in extension portion 356 (FIGS. 13 and 14) on an outward facing surface of extension 356. This will hold latch arm 354 in engagement with extension 356. The detent mechanism can be released with the application of a reasonable degree of force to release the detent. Then, arm 354 can be pivoted back to the solid line open position shown in FIG. 15A.

When the arm 354 is in the closed, broken line position shown in FIG. 15A, as is illustrated, the arm 360 of a caddy 400 can be securely retained therein, as described in further detail hereinafter.

In addition to container 290 and connector device 340, the system may also include a portable transportation device, which can be moved readily by a customer. As shown, in the disclosed embodiment, the portable transportation device is a caddy device 400 as shown in FIGS. 18 and 19.

Caddy 400 has a telescoping handle mechanism 410, which can be constructed in a known manner. Handle mechanism 410 as illustrated, can have three sections, including an upper portion 360c, which can telescope into middle section 360b, which in turn can telescope into lower section 360a. Each section comprises a pair of spaced rod members. The rods are in part maintained in spaced relation by at least one transverse bar member. The fully extended position of the handle shown in FIG. 13 has a locking mechanism which can be released through activation of a pivot arm 361, in a known manner. By way of example only, telescoping handles that are supplied by Shen Tsan Techology Co Ltd of Tai Chung, Taiwan, such as those which comprise part of the carts sold under model nos ST-305-1 and/or ST-305A could be employed for this purpose.

Caddy 400 also includes a wheeled base portion 409, to which is pivotally secured to the handle mechanism 410. Base portion 409 has a base 412, and a handle and wheel mounting portion generally designated 425 integrally formed therewith. Mounting portion 425 includes a cross bar 423 which has at least an upper portion that is positioned above the plane of upper surface 412a of base 412 and is spaced from rear transverse end plate 426 of base 412. Additionally interposed between end plate 26 and bar 423 are one or more openings formed between longitudinally oriented strut members 421. The lower portions 360a of handle 410 are mounted in sockets 433 positioned in the openings and mounted for pivoting rotation of handle 410 relative to base 412. Sockets 433 are mounted on one or more transversely oriented rods 409 for pivoting rotation of the handle 410 between the operational position shown in FIG. 18 and the storage position shown in FIG. 19.

Figure 19:
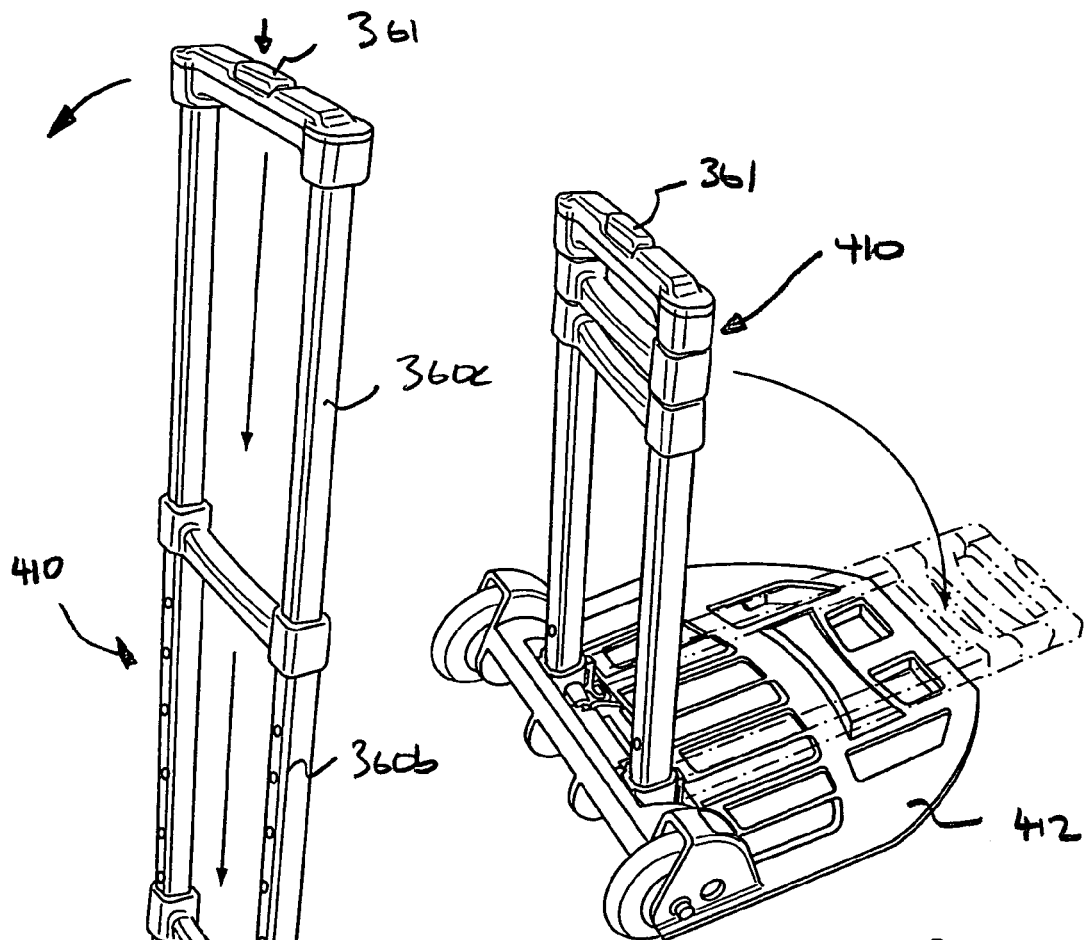
FIG. 19 is a perspective view of the container caddy of FIG. 18 in a storage configuration.
Figure 16:
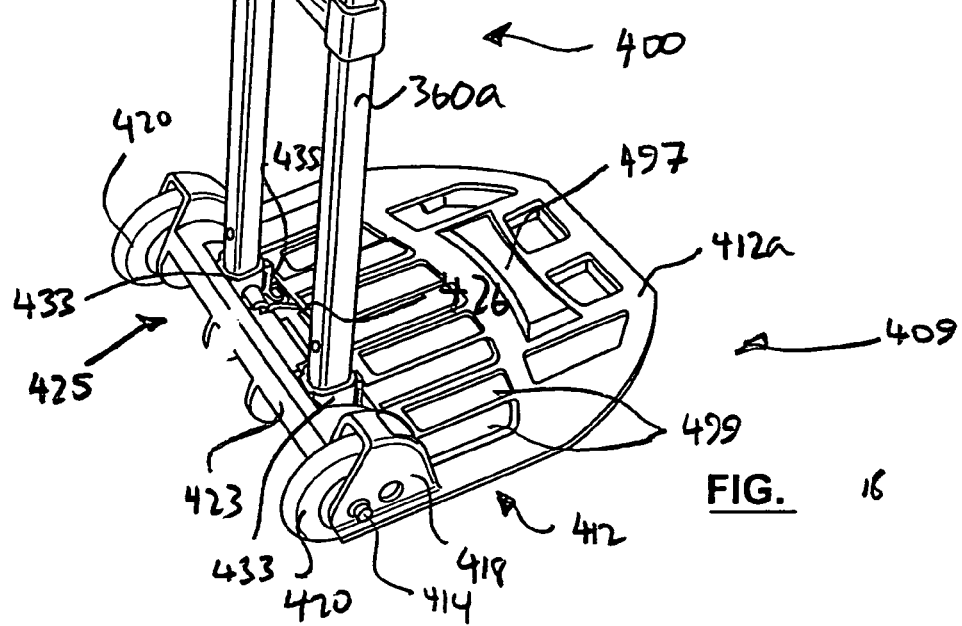
Figure 20:
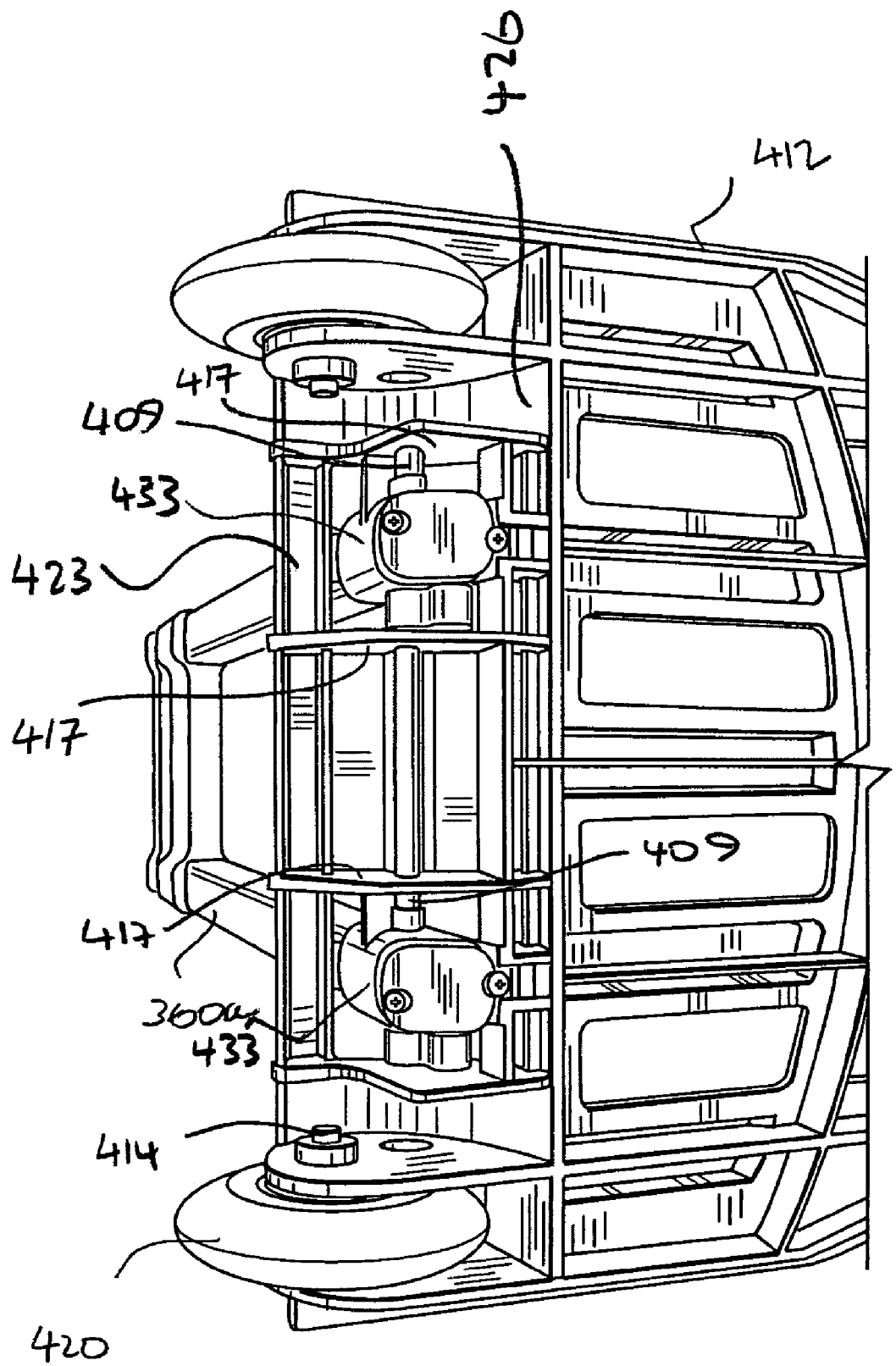
FIG. 20 is an enlarged bottom view of the container caddy of FIGS. 16-19.
Figure 21:
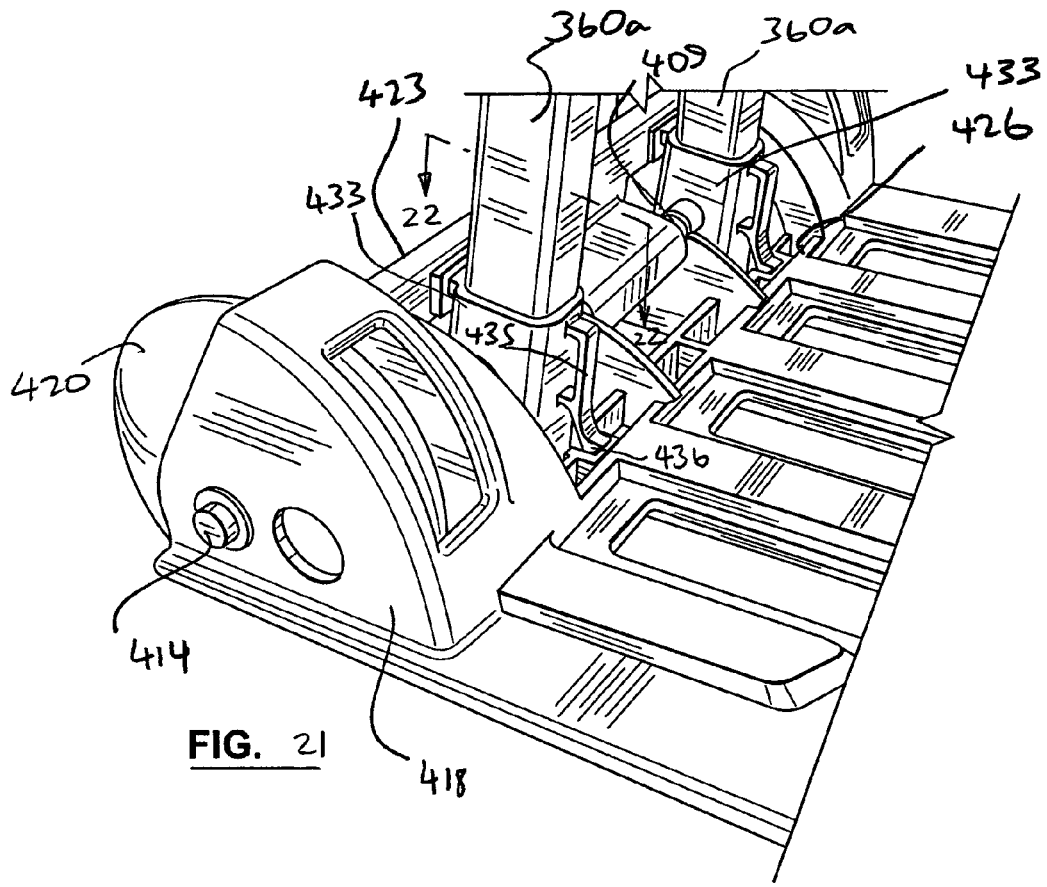
FIG. 21 is an enlarged side perspective view of the container caddy of FIGS. 16-19.
Figure 23:
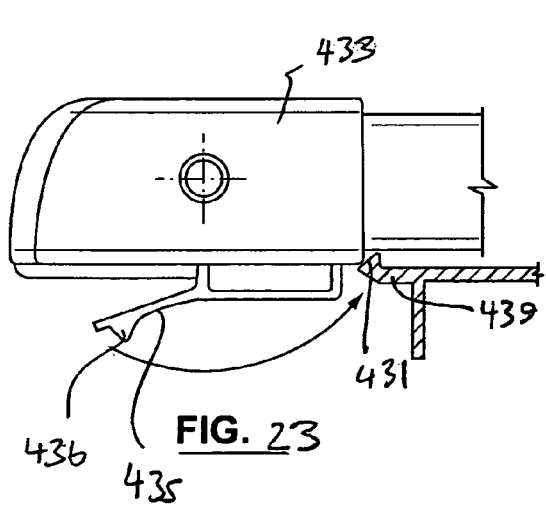
FIG. 23 is a sectional view similar to FIG. 22 showing the handle in an alternate position.
Figure 22:
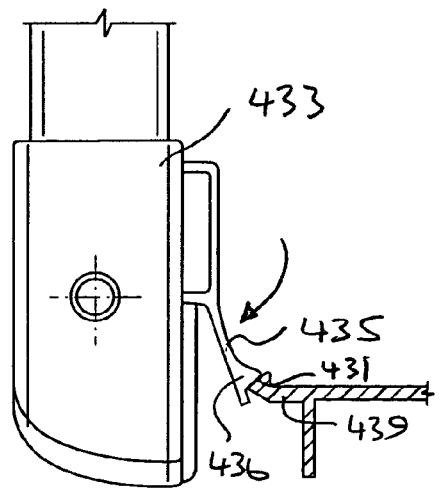
FIG. 22 is a sectional view at 22-22 in FIG. 21 illustrating a handle position locking mechanism for the caddy.

As shown in FIGS. 18 and 19, handle 410 can rotate towards and sit flush with base 412 for easy storage and handling, with the handle 410 telescoped to a fully retracted position. A locking mechanism can also be provided, to ensure that handle 410 can be secured in its operational pivot position relative to base 412, as is shown in FIGS. 18-23. In one embodiment, the locking mechanism is a protruding arm member 435 which may be mounted to or integrally formed with each socket 433. Arm 435 has an upward sloping end portion 436 that is positioned to engage a sloped surface 431 of a protrusion 439 that extends from end plate 426. One or both of arm 435 and protrusion 439 can be formed of a resilient material that can be displaced with the application of force. Arm 435 interacts with the protrusion 439 as a detent mechanism such that when the handle 410 is in the upright operational position (FIGS. 21 and 22), the arm is releasably locked on or engaged with the protrusion. However, as shown in FIG. 23, the handle 410 can be rotated at socket 433 with the application of a force so that arm 436 disengages from sloping surface 431.

Base 412 has mounted thereto, rotatable axle member 414 in each wheel well 418. Wheels 420 are mounted for rotation, preferably with bearings, in wheel wells 418. Thus, when in the operational position, as shown in FIG. 18, caddy 400 can be moved on its wheels, typically with the base 412 tilted along with the handle in a slightly counterclockwise direction (see arrow at top of handle in FIG. 18).

The upper surface of base platform 412 has laterally extending protrusions 499 which are configured to also be received, in a manner similar to protrusions 301 on lid member 310, into apertures or slots 299 in the base 298 of container 290. Additionally, a laterally extending protrusion 497 is configured in shape and size to be received in medial aperture 297 in base surface 298b of container 290.

As illustrated in FIGS. 13, 14 and 15, a container 290, which is connected to a connector device 340 by way of a container connector 346, as described above, can be secured to a caddy 400 as illustrated. As shown in FIG. 13, a container is placed such that the base 298 at its lower surface 298b is sitting on the upper surface 412a of platform base 412. Protrusions 497 and 499 can be received in channels 297 and 299, respectively.

Handle portions 360a are received into slots 349 formed between a side portion of housing 352 and extensions 356. Once in slots 349, latch plates 363 can be rotated as shown in FIG. 15A to engage extension 356, thus securing handle portions 360a in corresponding slots 349. When both caddy connectors 344 are secured to the handle portions 360a, the container 290 is securely mounted to caddy 400.

As shown in FIG. 16, once a first container 290 is securely mounted on base 412 of caddy 400, a second container 290 can thereafter be mounted on top of the first container and likewise its caddy connector can be secured to the middle portions 360b, as shown in FIGS. 16 and 17.

Figure 24:
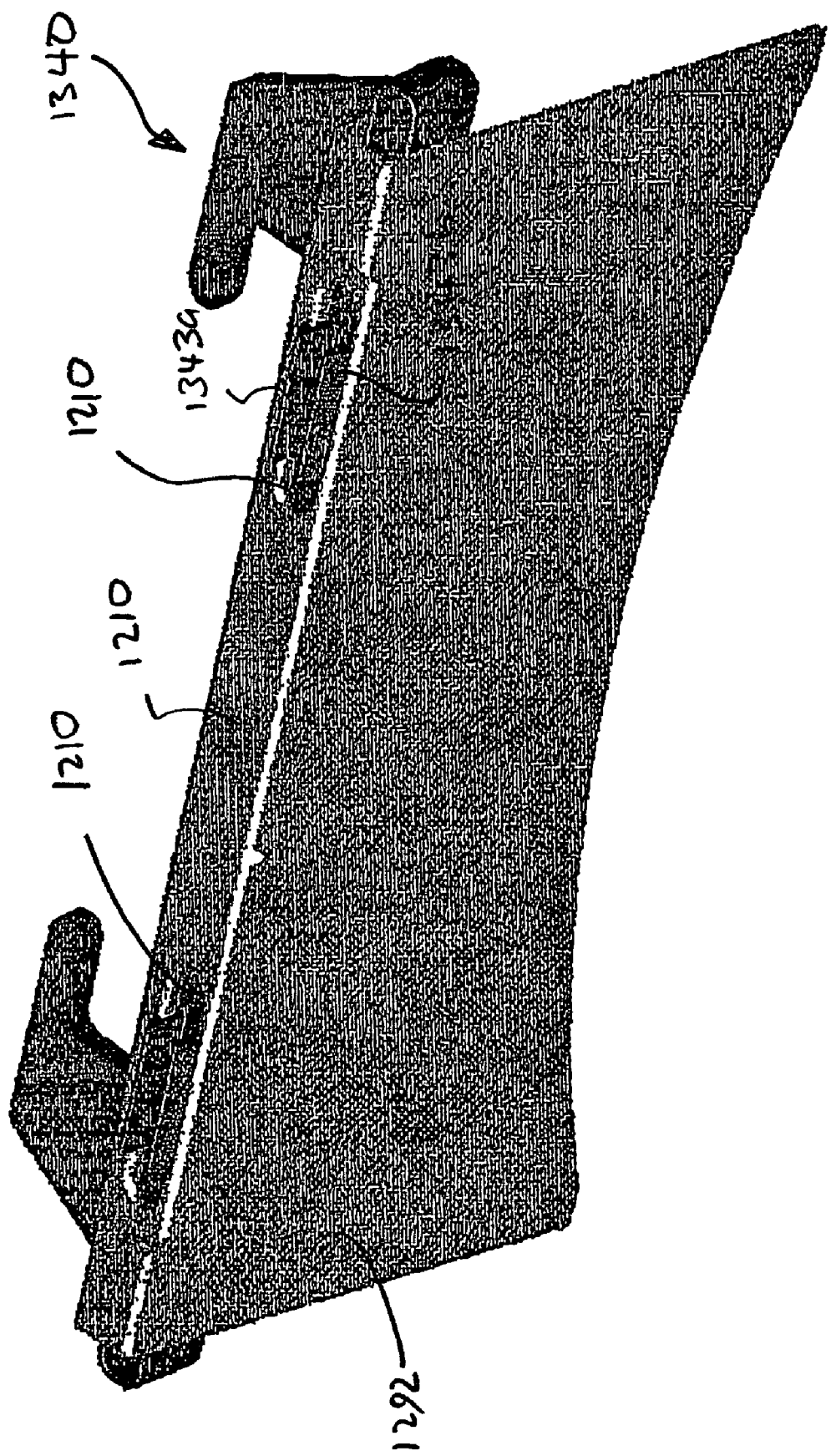
FIG. 24 is a schematic front perspective view of an alternate connector device shown attached to portion of a container.
Figure 25:
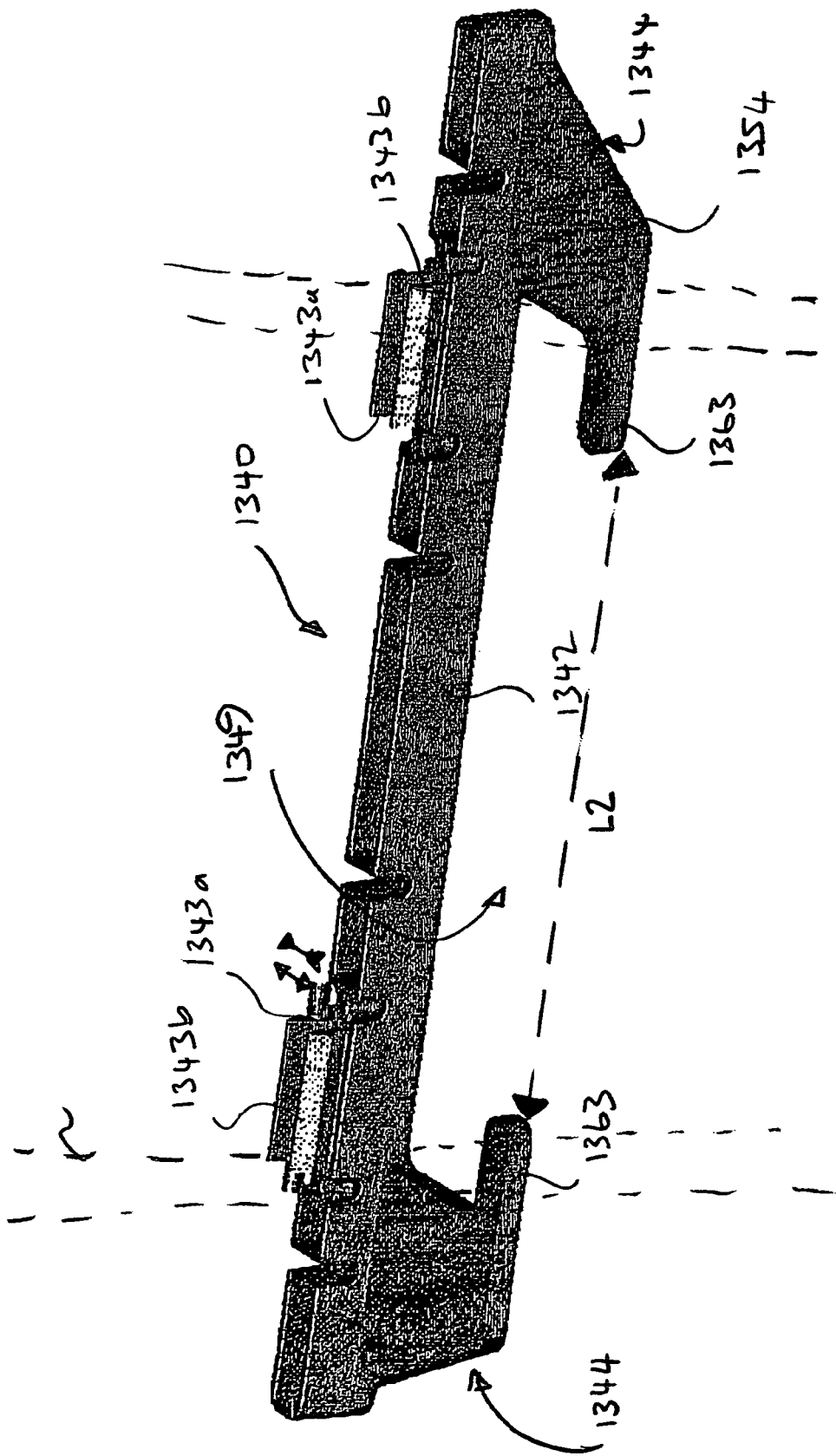
FIG. 25 is a schematic rear perspective view of the connector device of FIG. 24 shown in isolation.

Other types of caddy connecting mechanisms can be employed such as by way of example a connector as shown in FIGS. 24 and 25 described hereinafter. Also, it is possible that the connector device 340 could be permanently affixed or be integrally formed with the caddy, so that only a container connector mechanism of some kind would be required.

In use, containers 290 will typically be secured to shopping carts in the vicinity of the store. Usually, once the check out procedure at the store has been completed, containers 290 can be removed from the shopping cart, and be mounted to caddy 400 as illustrated in the drawings, and as described above. In some uses, the connectors 340 will have remained secured to the containers 290 throughout the shopping process. However, it may possibly be desired in some circumstances, to temporarily detach the connectors 340 from the containers 290 at sometime, such as when the containers are mounted to the shopping cart.

During the shopping procedure, the container lids 310 are typically removed at least part of the time, and can be secured somewhere on the shopping cart. Of course prior to mounting on the caddy, the lids 310 are typically put on top of each of the containers to close the goods therein.

Upon securely mounting the containers 290 to caddy 400, the customer can then take the goods home by wheeling the caddy with the containers mounted thereto to their premises. At the customer's premises, or elsewhere, one or more of the containers can be detached from the caddy. This will typically involve retracting the latch plates 363 such that the detents 365 will become detached from engagement with the slots 396 in extensions 356. The latch plates 363 are then retracted to the open position. Alternatively, or in addition, the container connector 346 can be released to allow the connector device 340 to be detached from the container 290. This is done by rotating the head portions 343 of protrusions 348 to the position where the heads 343 can be moved axially through apertures 210.

After the transportation of the containers is completed, the caddy can, as shown in FIGS. 18 and 19, have its handle telescoped down and rotated to be substantially flush with the base 412 for ease of storage.

In FIGS. 24 and 25, an alternate connector device 1340 is disclosed which includes a container connector 1346 and caddy connector 1344 at each end of a channel member 1342. Each of the container connectors 1346 has a pair of longitudinally extending, spaced and upstanding arms 1343a, 1343b. The arms 1343a, 1343b can be shaped in combination as generally as an arrow head. Arms 1343a, 1343b are made of a material that can be resiliently displaced inwards to that the head can be accomodated through the aperture 1210 is the side wall 1292 of a container, which may be like container 290. Once received through the aperture 1210 the barb portion of the arrow head will prevent the arms from being pulled back through the aperture, unless there is an inward external force applied to the arms to displace them inwards.

The connector device 1344 for the portable transportation device is shown as a pair of transversely extending leg members 1354, which have leg extensions 1363 directed longitudinally, but towards each other, having ends separated by a length L2 as shown in FIG. 25. The handles (shown only in ghost outline in FIG. 25) of a caddy, or a part of another transportation device, can be fed through the slot 1349 so that the connector device 1344 can be attached to the transportation device. Thus, when the connector 1340 is employed, the container can be used in the same manner as described above, with both a shopping cart and with a portable transportation device. While what is shown and described herein constitutes preferred and alternative embodiments of the subject invention, it will be understood that various changes can be made to such embodiments without departing from the subject invention, the scope of which is defined in the appended claims.

The invention claimed is:

1. A system comprising:
   a) a shopping cart;
   b) a portable transportation device; and
   c) a container having a first structure for releasable connection to said shopping cart; and
   d) a connector having a first lock for engaging the first structure and having a second structure for releasable connection to said portable transportation device.

2. A system as claimed in claim 1 wherein the portable transportation device comprises a frame with at least one wheel attached thereto.

3. A system as claimed in claim 2 wherein said portable transportation device comprises a movable caddy having at least a pair of wheels, a supporting base adapted to support said container, and a handle interconnected to said base and said pair of wheels, and being adapted for moving said caddy.

4. A system as claimed in claim 2 wherein said container are said cart are co-operatively configured such that said container can be releasably mounted on said cart.

5. A system as claimed in claim 4 wherein said container, said connector and said portable transportation device are operatively configured such that said container can be releasably mounted to said portable transportation device through said connector.

6. A system as claimed in claim 5 wherein said portable transportation device comprises a movable caddy having at least a pair of wheels, a supporting base adapted to support said container, and a handle interconnected to said base and said pair of wheels, and being adapted for moving said caddy, said container being supported at least in part by said base of said caddy.

7. A system as claimed in claim 6 wherein said second connector is adapted to provide for a releasable connection between said container and said caddy.

8. A system as claimed in claim 7 wherein said connector is a separate connector device, operable to releasably connect said container and said caddy.

9. A system as claimed in claim 7 wherein said portable transportation device further comprises a handle with at least one rod adapted for moving said caddy, and said connector comprises a movable latch mechanism with a slot, for releasably securing said at least one rod of said handle of said caddy in said slot.

10. A system as claimed in claim 7 wherein said container has at least one aperture and said connector comprises a protrusion member adapted for releasable locking engagement with said aperture of said container.

11. A system as claimed in claim 10 wherein said connector is a separate connector device, operable to releasably connect said container and said caddy.

12. A system as claimed in claim 9 wherein said container comprises at least one aperture and said connector comprises a protrusion member adapted for releasable locking engagement with said aperture of said container.

13. A system as claimed in claim 5 wherein said container and said cart are configured to provide for a releasable connection between said container and said cart.

14. A system as claimed in claim 11 wherein releasable connection between said container and said cart comprises an aperture on one of said container and said cart, and a protrusion on the other of said container and said cart, said aperture and said protrusion being configured such that said protrusion can be received through said aperture to support said container on said cart, and said protrusion can be disengaged from said aperture, when said container is to be removed from said cart.

15. A method of using a system having a) a shopping cart; b) a portable transportation device; c) a container having a first structure adapted for releasable connection to said shopping cart; and a connector having a first lock for releasable connection with the first structure and having a second lock for releasable connection to said portable transportation device, said method comprising:
   i) attending at a location of a store at which said cart is located;
   ii) releasably attaching said container to said cart using said first structure;
   iii) placing at least one item in said container;
   iv) detaching said container from said cart;
   v) attaching the first lock of the connector to the first structure and attaching the second lock of the connector to the portable transportation device; and
   vi) moving said container with said one item away from said location of said store with said portable transportation device.

16. A method as claimed in claim 15 wherein said portable transportation device comprises at least a pair of wheels for moving said container, when said container is attached to said portable transportation device.

* * * * *